United States Patent
Nakai

(10) Patent No.: US 9,460,371 B2
(45) Date of Patent: Oct. 4, 2016

(54) INFORMATION PROCESSING APPARATUS AND IMAGE FORMING APPARATUS

(75) Inventor: Tatsunori Nakai, Tokyo (JP)

(73) Assignee: OKI DATA CORPORATION, Tokyo (JP)

(*) Notice: Subject to any disclaimer, the term of this patent is extended or adjusted under 35 U.S.C. 154(b) by 0 days.

(21) Appl. No.: 13/596,583

(22) Filed: Aug. 28, 2012

(65) Prior Publication Data
US 2013/0050725 A1 Feb. 28, 2013

(30) Foreign Application Priority Data

Aug. 31, 2011 (JP) ................................ 2011-188192

(51) Int. Cl.
G06K 15/00 (2006.01)
G06K 15/02 (2006.01)
H04N 1/00 (2006.01)
H04N 1/23 (2006.01)

(52) U.S. Cl.
CPC ............ G06K 15/02 (2013.01); G06K 15/408 (2013.01); G06K 15/4055 (2013.01); H04N 1/0096 (2013.01); H04N 1/00814 (2013.01); H04N 1/00822 (2013.01); H04N 1/00904 (2013.01); H04N 1/2338 (2013.01); H04N 1/2346 (2013.01); H04N 1/2369 (2013.01); H04N 2201/0094 (2013.01)

(58) Field of Classification Search
CPC combination set(s) only.
See application file for complete search history.

(56) References Cited

U.S. PATENT DOCUMENTS

| 6,188,419 B1* | 2/2001 | Katamoto ............ H04N 1/2307 347/115 |
| 6,501,560 B1* | 12/2002 | Takayanagi .............. H04N 1/23 358/1.1 |
| 6,618,159 B1* | 9/2003 | Tobita et al. ................ 358/1.13 |
| 6,621,592 B1* | 9/2003 | Takayama .......... H04N 1/00954 358/1.15 |
| 2010/0161819 A1* | 6/2010 | Ohara .................... G06F 3/1221 709/229 |
| 2011/0181917 A1* | 7/2011 | Iguchi .................... B65H 37/04 358/296 |
| 2012/0194840 A1* | 8/2012 | Yamaguchi ........ H04N 1/00899 358/1.13 |

FOREIGN PATENT DOCUMENTS

| JP | 2004-012869 A | 1/2004 |
| JP | 2007-090570 | 4/2007 |
| JP | 2009-265255 A | 11/2009 |

* cited by examiner

Primary Examiner — Tammy Pham
Assistant Examiner — Keara Harris
(74) Attorney, Agent, or Firm — Kubotera & Associates, LLC

(57) ABSTRACT

An information processing apparatus includes a first processing unit for performing a first process according to a first request signal; a second processing unit for performing a second process according to a second request signal; and a control unit for controlling at least one of the first processing unit and the second processing unit to perform the first process or the second process at a low processing speed when the control unit detects the second request signal when the first processing unit performs the first process.

17 Claims, 12 Drawing Sheets

INFORMATION PROCESSING APPARATUS AND IMAGE FORMING APPARATUS

BACKGROUND OF THE INVENTION AND RELATED ART STATEMENT

The present invention relates to an information processing apparatus and an image forming apparatus. More specifically, the present invention relates to an information processing apparatus and an image forming apparatus capable of reading an original with a scanner and forming an image on a print medium.

A conventional image forming apparatus may include a scanner unit for performing a scanner reading operation relative to an original and a printing unit for forming an image on a print medium. The conventional image forming apparatus includes a conventional multifunction device having functions of a facsimile device, a copier, a printer, a scanner, and the like. The conventional multifunction device has a plurality of functions, so that the conventional multifunction device can perform a plurality of functions simultaneously. When the conventional multifunction device performs a plurality of functions simultaneously, a peak level of power consumption thereof tends to be increased.

In the conventional image forming apparatus, there has been a demand to perform each of the functions at a higher speed. Further, it has been requested to provide a post processing unit for performing a staple process and a punching process after the printing unit performs the image forming operation. Due to these demands, it has been necessary to reduce the peak level of power consumption of the conventional image forming apparatus.

Patent Reference has disclosed the conventional image forming apparatus capable of promptly and simply notifying information to a user in a language compatible with the user.

Patent Reference: Japanese Patent Publication No. 2007-90570

In the conventional information processing apparatus disclosed in Patent Reference, when another function is requested to perform during the image forming operation, it is difficult to reduce the peak level of power consumption thereof.

In view of the problems described above, an object of this application is to provide an information processing apparatus capable of reducing the peak level of power consumption thereof according to an operational state thereof.

SUMMARY OF THE INVENTION

In order to attain the objects described above, according to a first aspect of the present application, an information processing apparatus includes a first processing unit for performing a first process according to a first request signal; a second processing unit for performing a second process according to a second request signal; and a control unit for controlling at least one of the first processing unit and the second processing unit to perform the first process or the second process at a low processing speed when the control unit detects the second request signal when the first processing unit performs the first process.

According to a second aspect of the present invention, an information processing apparatus includes a first processing unit for performing a first process according to a first request signal; a second processing unit for selecting one of a first processing speed, a second processing speed slower than the first processing speed, and a third processing speed slower than the second processing speed, and for performing a second process at the one of the first processing speed, the second processing speed, and the third processing speed according to a second request signal; a third processing unit for performing a third process; and a control unit for controlling the second processing unit to perform the second process at the third processing speed when the control unit detects the second request signal when the first processing unit performs the first process and the third processing unit performs the third process.

Further, according to the second aspect of the present application, the control unit is configured to control the second processing unit to perform the second process at the second processing speed when the control unit detects the second request signal when the first processing unit performs the first process and the third processing unit does not perform the third process.

Further, according to the second aspect of the present application, the control unit is configured to control the second processing unit to perform the second process at the first processing speed when the control unit detects the second request signal when the first processing unit does not perform the first process and the third processing unit does not perform the third process.

According to a third aspect of the present application, an image forming apparatus includes a reading unit for performing a reading operation, and an image forming unit for performing an image forming operation on a medium.

Further, according to the third aspect of the present application, the image forming unit includes a request receiving unit for receiving a request signal of the image forming operation; a first state administration unit for retaining an operational state of the reading unit; a printing speed switching unit for switching a processing speed of the image forming operation to a lower speed when the operational state of the reading unit retained in the first state administration unit is a driven state; and a first control unit for performing the image forming operation at the low speed of the processing speed switched with the printing speed switching unit when the request receiving unit receives the request signal of the image forming operation when the operational state of the reading unit retained in the first state administration unit is the driven state.

Further, according to the third aspect of the present application, the reading unit includes a request obtaining unit for obtaining a request signal of the reading operation; a second state administration unit for retaining an operational state of the image forming unit; a reading speed switching unit for switching a reading speed of the reading operation to a lower speed when the operational state of the image forming unit retained in the second state administration unit is a driven state; and a second control unit for performing the reading operation at the low speed of the reading speed switched with the reading speed switching unit when the request obtaining unit obtains the request signal of the reading operation when the operational state of the image forming unit retained in the second state administration unit is the driven state.

BRIEF DESCRIPTION OF THE DRAWINGS

FIGS. 6(a) and 6(b) are flow charts showing an operation of the multifunction device according to the second embodiment of the present invention, wherein FIG. 6(a) is a flow chart showing the operation of the multifunction device when the printing operation is requested, and FIG. 6(b) is a flow chart showing the operation of the multifunction device when the scanner reading operation is requested;

FIGS. 12(a) and 12(b) are flow charts showing an operation of the multifunction device according to the fourth embodiment of the present invention, wherein FIG. 12(a) is a flow chart showing the operation of the multifunction device when the printing operation is requested, and FIG. 12(b) is a flow chart showing the operation of the multifunction device when the scanner reading operation is requested.

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the embodiments.

First Embodiment

Figure 1:
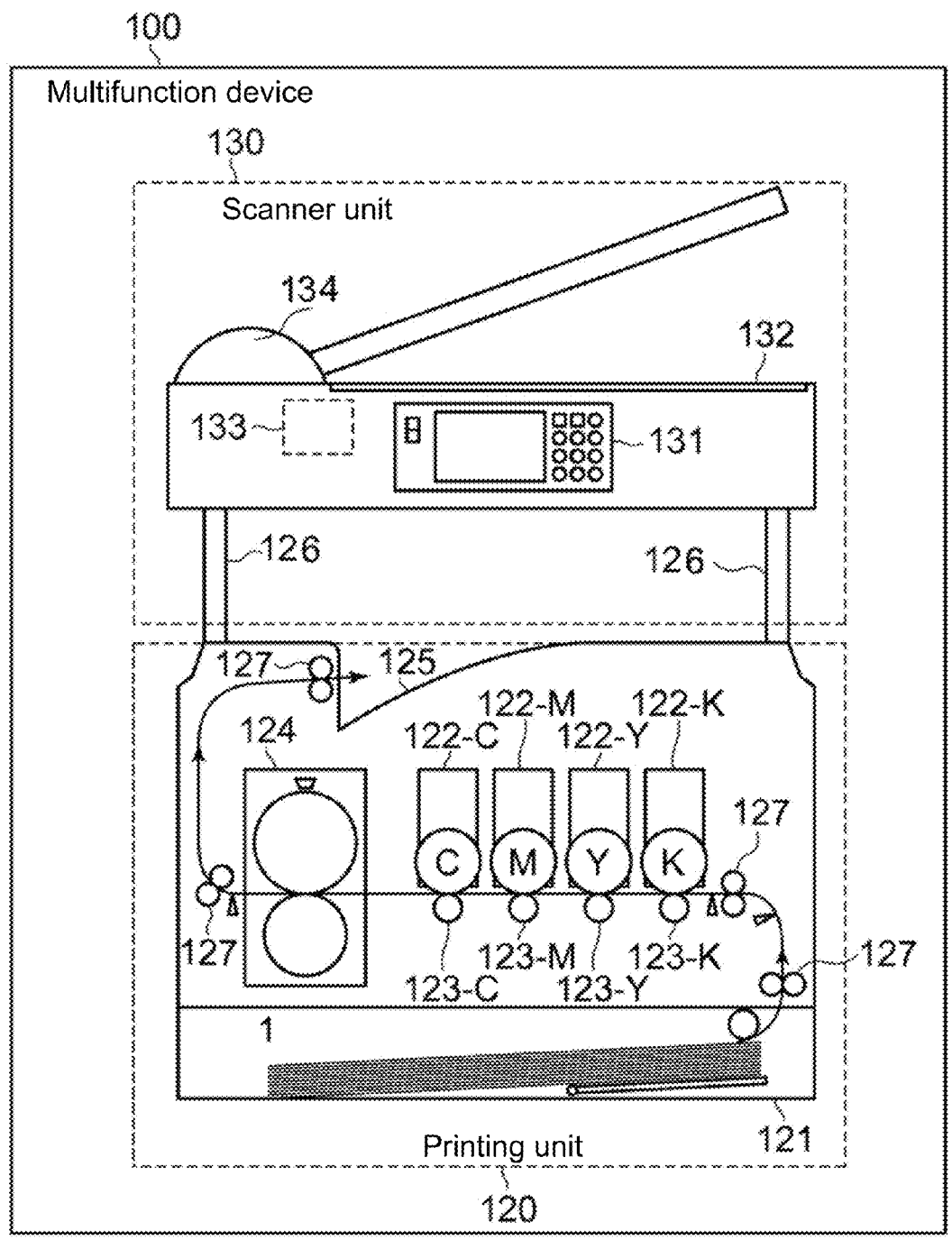
FIG. 1 is a schematic sectional view showing a configuration of a multifunction device according to a first embodiment of the present invention.

A first embodiment of the present invention will be explained. FIG. 1 is a schematic sectional view showing a configuration of a multifunction device 100 according to the first embodiment of the present invention.

As shown in FIG. 1, the multifunction device 100 as an information processing apparatus or an image forming apparatus includes a printing unit 120 for printing on a print medium and a scanner unit 130 for reading an original. The print medium may include a sheet and a paper. A plurality of supporting members 126 is disposed under the printing unit 120 disposed at a lower portion of the multifunction device 100, so that the supporting members 126 support the scanner unit 130 disposed at an upper portion of the multifunction device 100.

In the embodiment, the printing unit 120 includes a sheet storage tray 121 for storing the print medium and an image forming portion 122 to which the print medium is transported one by one. The image forming portion 122 is configured to form an image on a photosensitive drum using developer through an electro-photographic process.

In the embodiment, in order to form a color image, the image forming portion 122 includes a black image forming unit 122-K, a yellow image forming unit 122-Y, a magenta image forming unit 122-M, and a cyan image forming unit 122-C. A transfer portion 123 is configured to transfer a developer image formed on the photosensitive drum of the image forming portion 122 to the print medium. Similarly, in order to form the color image, the transfer portion 123 includes a black transfer unit 123-K, a yellow transfer unit 123-Y, a magenta transfer unit 123-M, and a cyan transfer unit 123-C. A fixing portion 124 is configured to fix the developer image transferred to the print medium to the print medium through heat. A main body stacker 125 is disposed at the upper portion of the printing unit 120 for discharging and stacking the print medium thus printed.

In the embodiment, a printing speed corresponds to a transportation speed of the print medium in the printing unit 120. Further, the transportation speed of the print medium corresponds to a drive speed of a transportation roller 127 or a drive speed of a transportation belt in the printing unit 120. When the drive speed is high, a peak level of power consumption tends to increase. Further, when the transportation speed of the print medium is high, it is necessary to increase a fixing temperature of the fixing portion 124, thereby increasing power consumption. On the other hand, when the transportation speed of the print medium is low, it is possible to decrease the fixing temperature of the fixing portion 124, thereby decreasing power consumption.

In the embodiment, the scanner unit 130 includes an operation panel 131 having a display unit such as an LCD (Liquid Crystal Display) and the like and a switch, so that the scanner unit 130 receives scan data according to an operation of an operator. The scan data include a reading density, a size of the original, the number of sheets in case of copying, a size of the print medium, and the like.

In the embodiment, a contact glass 132 is configured to place the original one by one as a reading subject. A scanner 133 is disposed inside the scanner unit 130 for reading the original as the reading subject and converting to read data. An auto feeder 134 is configured to feed a plurality of originals one by one when there is a plurality of originals, and transporting the original to a reading position of the scanner 133, so that the scanner unit 130 reads the originals automatically.

Figure 2:
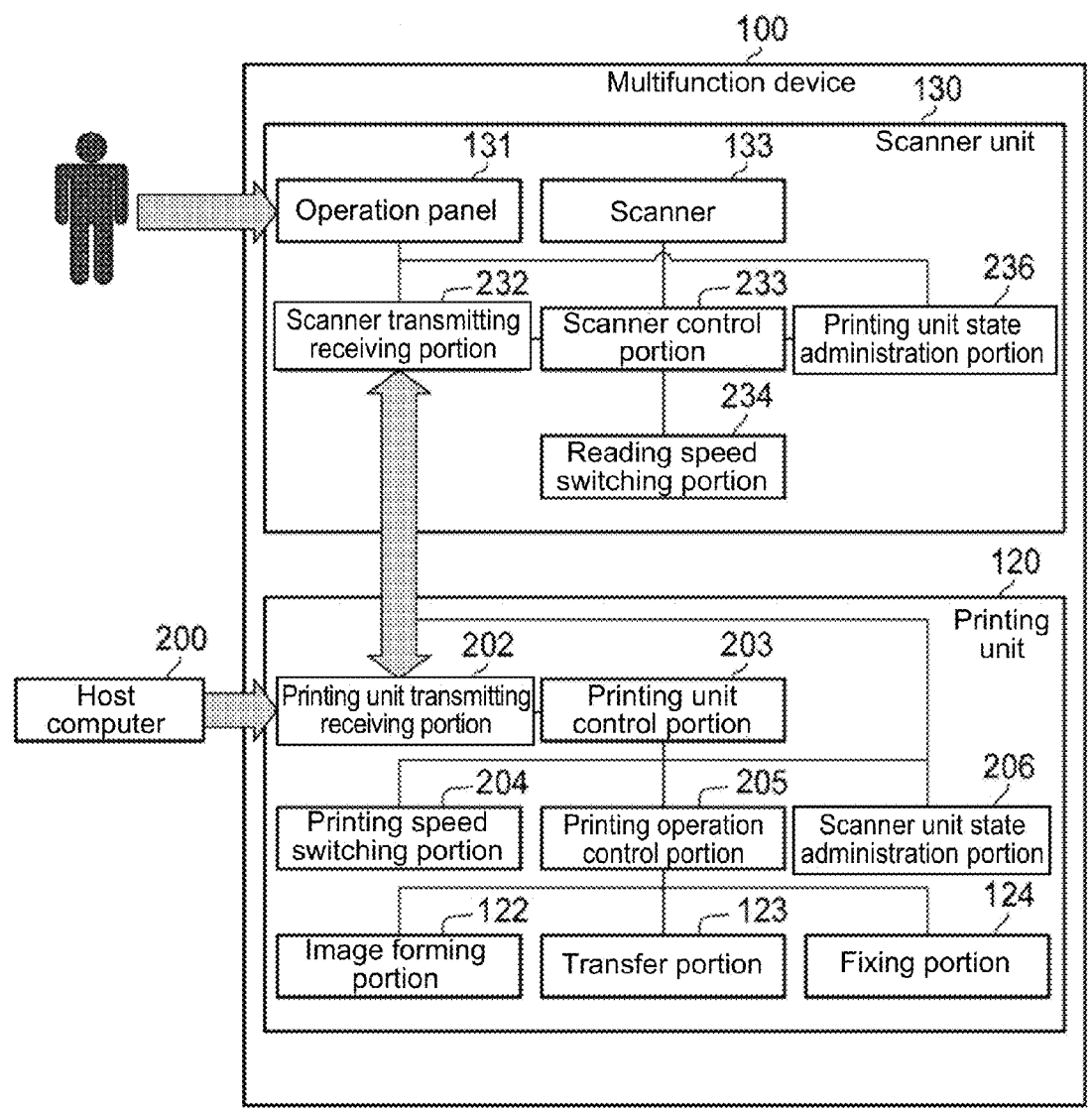
FIG. 2 is a block diagram showing the configuration of the multifunction device according to the first embodiment of the present invention.

FIG. 2 is a block diagram showing the configuration of the multifunction device 100 according to the first embodiment of the present invention. As shown in FIG. 2, the printing unit 120 includes a printing unit transmitting receiving portion 202 as a printing operation requesting receiving portion for transmitting and receiving print data as a request signal of the printing operation with a host computer 200 that is configured to transmit print information. Further, the printing unit transmitting receiving portion 202 is configured to transmit and receive scan data and read data with respect to a scanner transmitting receiving portion 232 of the scanner unit 130.

In the embodiment, the printing unit 120 further includes a printing unit control portion 203 as a control portion for controlling each component of the printing unit 120. A printing operation control portion 205 is configured to control each component of the image forming portion 122, the transfer portion 123, the fixing portion 124, and the like, so that the printing operation control portion 205 controls the printing operation. A scanner unit state administration portion 206 is configured to hold information regarding an operational state of the scanner unit 130 such as a driven state or a waiting state. A printing speed switching portion 204 is configured to switch the printing speed under control of the printing unit control portion 203 according to the operational state of the scanner unit 130. When the printing speed is high, instant power consumption of the printing unit 120 tends to be increased.

In the embodiment, in the scanner unit 130, the operation panel 131 is configured to receive a request of the scanner reading operation operated by the operator. The scanner transmitting receiving portion 232 is configured to transmit and receive the scan data and the read data with respect to the operation panel 131 and the printing unit transmitting receiving portion 202 after the operation panel 131 receives the request of the scanner reading operation. A scanner control portion 233 as a control portion is configured to control the scanner 133 for performing the scanner reading operation. Further, the scanner control portion 233 is configured to control each component of the scanner unit 130.

In the embodiment, a printing unit state administration portion 236 is configured to hold information regarding an operational state of the printing unit 120 such as the driven state and the waiting state. A reading speed switching portion 234 is configured to switch the reading speed of the scanner 133 under control of the scanner control portion 233 according to the operational state of the printing unit 120. When the reading speed is high, instant power consumption of the scanner unit 130 tends to be increased.

Figure 3:
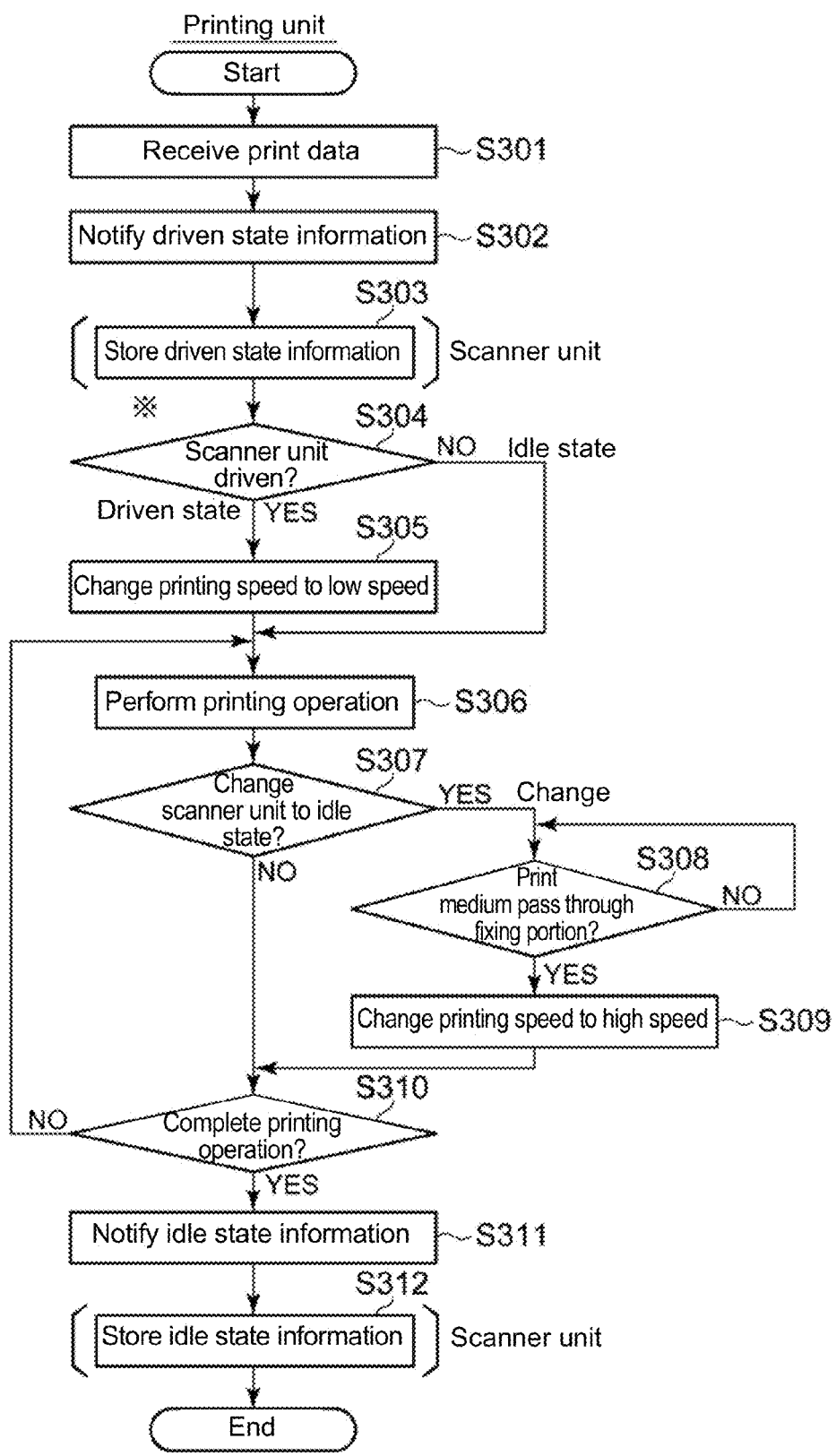
FIG. 3 is a flow chart showing an operation of the multifunction device when a printing operation is requested according to the first embodiment of the present invention.

An operation of the multifunction device 100 will be explained. In the following description, the operation of the multifunction device 100 will be explained separately when the printing operation is requested and when the scanner reading operation is requested. When the printing operation is requested, the print data is received. FIG. 3 is a flow chart showing the operation of the multifunction device 100 when the printing operation is requested according to the first embodiment of the present invention.

In step S301, the printing unit transmitting receiving portion 202 of the printing unit 120 receives the print data as the request signal of the printing operation from the host computer 200. In step S302, after the printing unit transmitting receiving portion 202 receives the print data, the printing unit transmitting receiving portion 202 notifies the driven state information indicating that the printing unit 120 is being driven to the scanner transmitting receiving portion 232 of the scanner unit 130.

In step S303, the scanner transmitting receiving portion 232 of the scanner unit 130 notifies the driven state information thus notified to the scanner control portion 233. Then, the scanner control portion 233 instructs the printing unit state administration portion 236 to store the driven state information thus notified.

In step S304, the printing unit control portion 203 of the printing unit 120 instructs the scanner unit state administration portion 206 to notify the operational state of the scanner unit 130. When the printing unit control portion 203 obtains the operational state of the scanner unit 130 from the scanner unit state administration portion 206, the printing unit control portion 203 determines whether the scanner unit 130 is driven. When the printing unit control portion 203 determines that the scanner unit 130 is driven, the process proceeds to step S305. When the printing unit control portion 203 determines whether the scanner unit 130 is not driven, that is, the scanner unit 130 is in an idle state, the process proceeds to step S306.

In step S305, when the printing unit control portion 203 determines that the scanner unit 130 is driven, the printing unit control portion 203 instructs the printing speed switching portion 204 to change the printing speed to a low speed. It should be noted that when the printing speed is changed to the low speed, the instant power consumption of the printing unit 120 is decreased. More specifically, when the printing speed is changed to the low speed, the instant power consumption of the multifunction device 100 as a whole becomes lower than the instant power consumption of the multifunction device 100 as a whole immediately before the printing speed is changed to the low speed. Further, when the printing speed is changed to the low speed, it may be configured such that the fixing temperature of the fixing portion 124 is decreased.

In step S306, the printing unit control portion 203 instructs the printing operation control portion 205 to perform the printing operation. Further, the printing operation control portion 205 starts the operation of the image forming portion 122, the transfer portion 123, and the fixing portion 124. At this moment, the printing operation control portion 205 performs the printing operation at the printing speed thus changed with the printing speed switching portion 204. More specifically, when the scanner unit 130 is driven, the printing operation control portion 205 performs the printing operation at the low speed. When the scanner unit 130 is in the idle state, the printing operation control portion 205 performs the printing operation at the high speed.

In step S307, during the printing operation of the printing unit 120, the printing unit control portion 203 instructs the scanner unit state administration portion 206 to notify the operational state of the scanner unit 130. Then, when the printing unit control portion 203 obtains the operational state of the scanner unit 130 from the scanner unit state administration portion 206, the printing unit control portion 203 determines whether the scanner unit 130 is changed to the idle state. When the printing unit control portion 203 determines that the scanner unit 130 is changed to the idle state, the process proceeds to step S308. When the printing unit control portion 203 determines that the scanner unit 130 is maintained in the driven state or the idle state, the process proceeds to step S310.

In step S308, when the printing unit control portion 203 determines that the scanner unit 130 is changed to the idle state, the printing unit control portion 203 instructs the printing operation control portion 205 to monitor whether the print medium as the subject of the image forming operation (for example, the first sheet) passes through the fixing portion 124. In this case, it may be configured such that the printing unit control portion 203 instructs the printing operation control portion 205 to monitor whether the printing operation is completed on the print medium.

In step S309, when the print medium passes through the fixing portion 124, or the printing operation is completed on the print medium, the printing unit control portion 203 instructs the printing speed switching portion 204 to change the printing speed of the printing operation on the print medium to become the subject of the printing operation next (for example, the second sheet and after) to the high speed. At this moment, when the printing speed is increased, the fixing temperature of the fixing portion 124 may be increased.

In step S310, the printing unit control portion 203 determines whether the printing operation of the print data is completed. When the printing unit control portion 203 determines that the printing operation of the print data is completed, the process proceeds to step S311. When the printing unit control portion 203 determines that the printing operation of the print data is not completed, the process returns to step S306, so that the printing operation is continued at the high speed or the low speed of the printing speed.

In step S311, when the printing unit control portion 203 determines that the printing operation of the print data is completed, the printing unit transmitting receiving portion 202 notifies the scanner transmitting receiving portion 232 of the scanner unit 130 that the printing unit 120 becomes the idle state as the idle state information.

In step S312, the scanner transmitting receiving portion 232 of the scanner unit 130 notifies the idle state information thus notified to the scanner control portion 233. Then, the scanner control portion 233 instructs the printing unit state administration portion 236 to store the idle state information thus notified.

As described above, in the embodiment, the printing unit 120 is provided with the printing speed switching portion 204. Accordingly, in the operation of the multifunction device 100 when the printing operation is requested, when the printing unit 120 receives the print request signal during the reading operation of the scanner unit 130, it is possible to perform the printing operation at the low speed. As a result, it is possible to reduce the peak level of power consumption of the multifunction device 100 as a whole.

Further, in the embodiment, the printing unit 120 is provided with the scanner unit state administration portion 206. Accordingly, when the scanner unit 130 is changed to the idle state during the printing operation and the print medium as the subject of the image forming operation (for example, the first sheet) passes through the fixing portion 124, it is possible to perform the printing operation at the high speed on the print medium to become the subject of the image forming operation next (for example, the second sheet and after).

Figure 4:
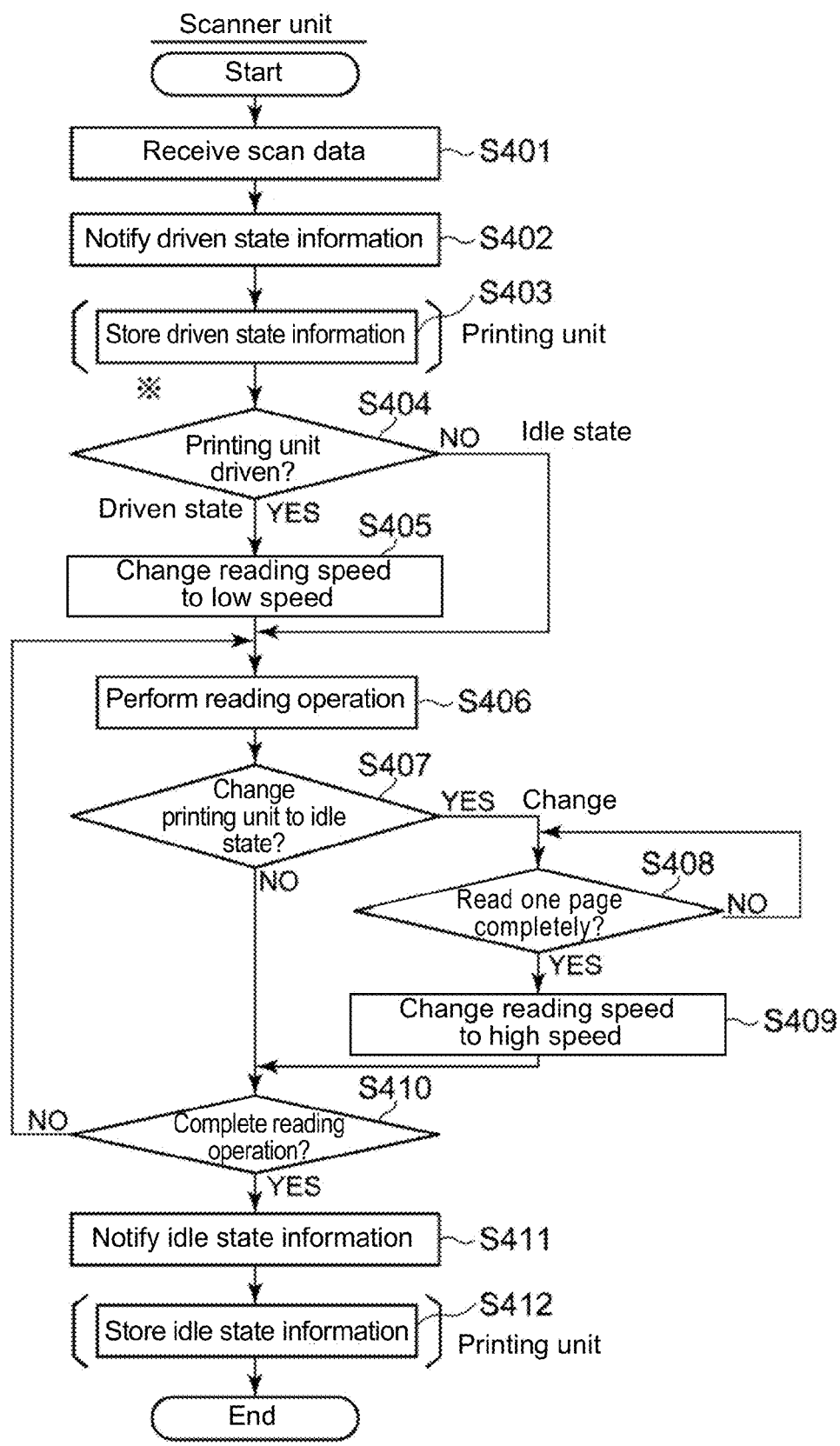
FIG. 4 is a flow chart showing the operation of the multifunction device when a scanner reading operation is requested according to the first embodiment of the present invention.

FIG. 4 is a flow chart showing the operation of the multifunction device 100 when the scanner reading operation is requested according to the first embodiment of the present invention.

In step S401, the scanner transmitting receiving portion 232 of the scanner unit 130 receives the scan data as the request signal of the scanner reading operation from the operation panel 131 that the operator operates.

In step S402, after the scanner transmitting receiving portion 232 receives the scan data, the scanner transmitting receiving portion 232 notifies the driven state information indicating that the scanner unit 130 is being driven to the printing unit transmitting receiving portion 202 of the printing unit 120.

In step S403, the printing unit transmitting receiving portion 202 of the printing unit 120 notifies the driven state information of the scanner unit 130 thus notified to the printing unit control portion 203. Then, the printing unit control portion 203 instructs the scanner unit state administration portion 206 to store the driven state information thus notified.

In step S404, the scanner control portion 233 of the scanner unit 130 instructs the printing unit state administration portion 236 to notify the operational state of the printing unit 120. When the scanner control portion 233 obtains the operational state of the printing unit 120 from the printing unit state administration portion 236, the scanner control portion 233 determines whether the printing unit 120 is driven. When the scanner control portion 233 determines that the printing unit 120 is driven, the process proceeds to step S405. When the scanner control portion 233 determines whether the printing unit 120 is not driven, that is, the printing unit 120 is in the idle state, the process proceeds to step S406.

In step S405, when the scanner control portion 233 determines that the printing unit 120 is driven, the scanner control portion 233 instructs the reading speed switching portion 234 to change the scanner reading speed to the low speed. It should be noted that when the scanner reading speed is changed to the low speed, the instant power consumption of the scanner unit 130 is decreased. More specifically, when the scanner reading speed is changed to the low speed, the instant power consumption of the multifunction device 100 as a whole becomes lower than the instant power consumption of the multifunction device 100 as a whole immediately before the scanner reading speed is changed to the low speed.

In step S406, the scanner control portion 233 instructs the scanner 133 to perform the reading operation. At this moment, the scanner control portion 233 instructs the scanner 133 to perform the reading operation at the scanner reading speed thus changed with the reading speed switching portion 234. More specifically, when the printing unit 120 is driven, the scanner 133 performs the reading operation at the low speed. When the printing unit 120 is in the idle state, the scanner 133 performs the reading operation at the high speed.

In step S407, during the reading operation of the scanner 133, the scanner control portion 233 instructs the printing unit state administration portion 236 to notify the operational state of the printing unit 120. Then, when the scanner control portion 233 obtains the operational state of the printing unit 120 from the printing unit state administration portion 236, the scanner control portion 233 determines whether the printing unit 120 is changed to the idle state. When the scanner control portion 233 determines that the printing unit 120 is changed to the idle state, the process proceeds to step S408. When the scanner control portion 233 determines that the printing unit 120 is maintained in the driven state or the idle state, the process proceeds to step S410.

In step S408, when the scanner control portion 233 determines that the printing unit 120 is changed to the idle state, the scanner control portion 233 instructs the scanner 133 to notify whether one page of the original as the subject of the reading operation is read completely. Further, the scanner control portion 233 monitors whether the one page of the original is completely read.

In step S409, when the one page of the original as the subject of the reading operation is completely read, the scanner control portion 233 instructs the reading speed switching portion 234 to change the reading speed of the original as the subject of the reading operation next to the high speed. Accordingly, the scanner 133 reads the original as the subject of the reading operation next at the high speed of the reading speed.

In step S410, the scanner control portion 233 determines whether the reading operation of the scanner 133 is completed. When the scanner control portion 233 determines that the scanner 133 completely reads the reading data of the final page, the process proceeds to step S411. When the scanner control portion 233 determines that the scanner 133 does not completely read the reading data of the final page, the process returns to step S406, so that the reading operation is continued at the high speed or the low speed of the reading speed.

In step S411, when the scanner control portion 233 determines that the reading operation of the scanner 133 is completed, the scanner transmitting receiving portion 232 notifies the printing unit transmitting receiving portion 202 of the printing unit 120 that the scanner unit 130 becomes the idle state as the idle state information.

In step S412, the printing unit transmitting receiving portion 202 of the printing unit 120 notifies the idle state information of the scanner unit 130 thus notified to the printing unit control portion 203. Then, the printing unit control portion 203 instructs the scanner unit state administration portion 206 to store the idle state information thus notified.

As described above, in the embodiment, the scanner unit 130 is provided with the reading speed switching portion 234. Accordingly, in the operation of the multifunction device 100 when the scanner reading operation is requested, when the scanner unit 130 receives the reading request signal during the printing operation of the printing unit 120, it is possible to perform the reading operation at the low speed. As a result, it is possible to reduce the peak level of power consumption of the multifunction device 100 as a whole.

Further, in the embodiment, the scanner unit 130 is provided with the printing unit state administration portion 236. Accordingly, when the printing unit 120 is changed to the idle state during the reading operation and one page of the original as the subject of the reading operation is read completely, it is possible to change the reading speed of the scanner 133 to the high speed when the scanner 133 reads the original as the subject of reading operation next and after.

Second Embodiment

A second embodiment of the present invention will be explained next. In the first embodiment, the printing unit 120 is configured to perform the printing operation capable of forming the color image. In the second embodiment, the printing unit 120 is configured to perform the printing operation for forming a monochrome image.

Figure 5:
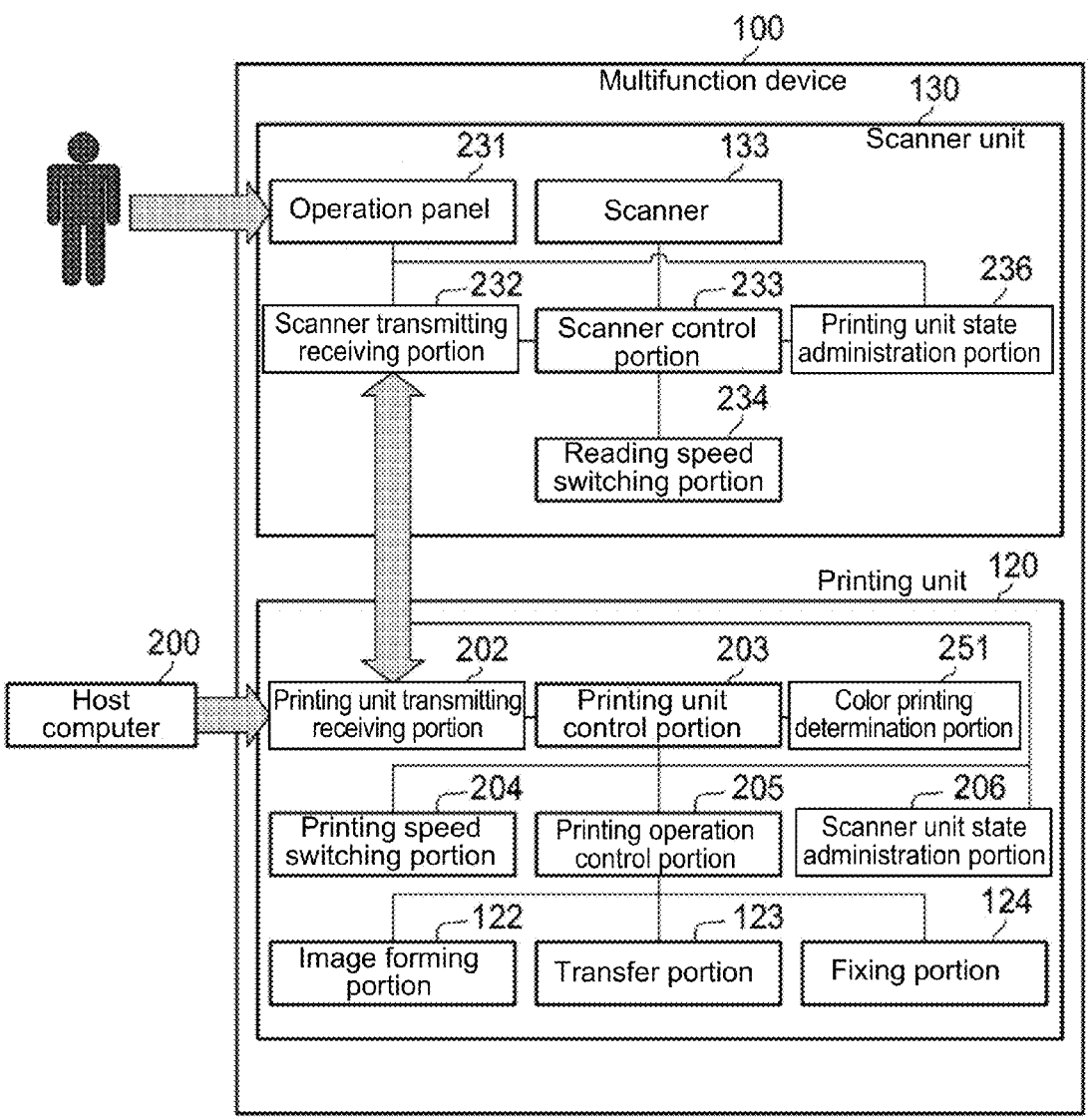
FIG. 5 is a block diagram showing a configuration of a multifunction device according to a second embodiment of the present invention.

FIG. 5 is a block diagram showing a configuration of the multifunction device 100 according to the second embodiment of the present invention.

In the second embodiment, different from the configuration of the multifunction device 100 in the first embodiment shown in FIG. 2, the printing unit 120 includes a color printing determination portion 251. The color printing determination portion 251 is provided for determining whether the printing unit 120 performs the color printing operation or the monochrome printing operation. Further, in the scanner unit 130, the printing unit state administration portion 236 is configured to store information indicating whether the operational state of the printing unit 120 is the driven state or the idle state. When the operational state of the printing unit 120 is the driven state, the printing unit state administration portion 236 is configured to store information indicating whether the printing unit 120 performs the color printing operation or the monochrome printing operation. Other components shown in FIG. 5 are similar to those of the multifunction device 100 in the first embodiment shown in FIG. 2, and explanations thereof are omitted.

Figure 6A:
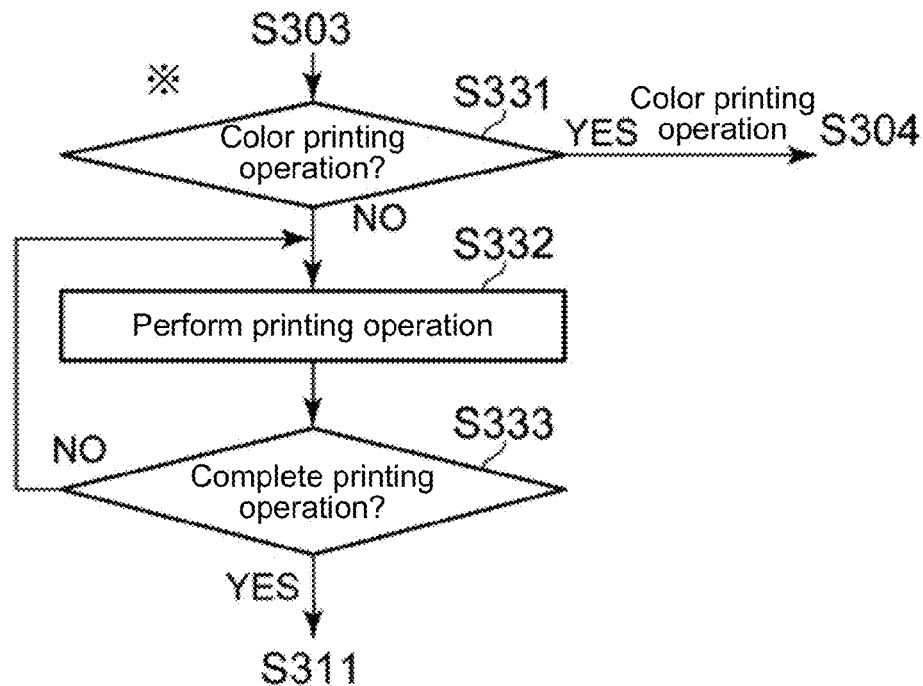
Figure 6B:
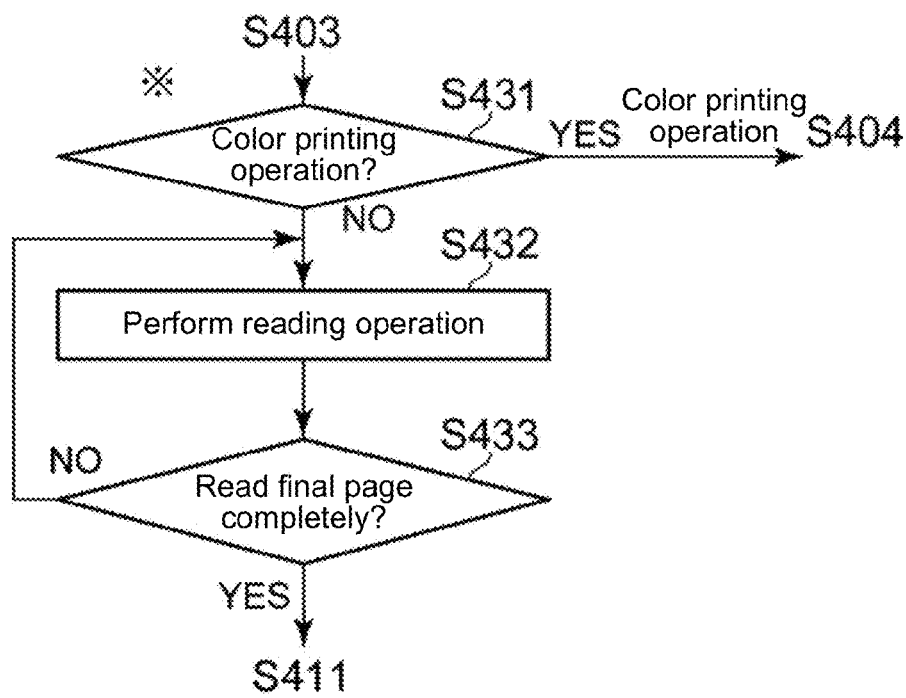

FIGS. 6(a) and 6(b) are flow charts showing an operation of the multifunction device 100 according to the second embodiment of the present invention. More specifically, FIG. 6(a) is a flow chart showing the operation of the multifunction device 100 when the printing operation is requested, and FIG. 6(b) is a flow chart showing the operation of the multifunction device 100 when the scanner reading operation is requested.

As described above, in step S301, the printing unit transmitting receiving portion 202 of the printing unit 120 receives the print data as the request signal of the printing operation from the host computer 200. In step S302, after the printing unit transmitting receiving portion 202 receives the print data, the printing unit transmitting receiving portion 202 notifies the driven state information indicating that the printing unit 120 is being driven to the scanner transmitting receiving portion 232 of the scanner unit 130. In step S303, the scanner transmitting receiving portion 232 of the scanner unit 130 notifies the driven state information thus notified to the scanner control portion 233.

After step S303, in step S331 shown in FIG. 6(a), the printing unit control portion 203 of the printing unit 120 instructs the color printing determination portion 251 to determine whether the printing unit 120 performs the color printing operation or the monochrome printing operation. When the color printing determination portion 251 determines that the printing unit 120 performs the color printing operation, the process proceeds to step S304. Accordingly, after it is determined whether the scanner unit 130 is in the driven state, when it is determined that the scanner unit 130 is in the driven state, the printing speed is changed to the low speed. When the color printing determination portion 251 determines that the printing unit 120 does not perform the color printing operation, that is, the printing unit 120 performs the monochrome printing operation, the process proceeds to step S332.

In step S332, the printing unit control portion 203 instructs the printing operation control portion 205 to perform the printing operation. Further, the printing operation control portion 205 starts the operation of the image forming portion 122, the transfer portion 123, and the fixing portion 124. At this moment, the printing operation control portion 205 performs the printing operation at the high printing speed.

In step S333, the printing unit control portion 203 determines whether the printing operation of the print data is completed. When the printing unit control portion 203 determines that the printing operation of the print data is completed, the process proceeds to step S311. When the printing unit control portion 203 determines that the printing operation of the print data is not completed, the process returns to step S332, so that the printing operation is continued at the high printing speed.

As described above, in the second embodiment, in the operation of the multifunction device 100 when the printing operation is requested, when the printing unit 120 performs the color printing operation, the printing speed is changed to the low printing speed, thereby making it possible to reduce the peak level of power consumption of the multifunction device 100 as a whole. For example, when the printing unit 120 receives the printing request signal of the color printing operation during the reading operation of the scanner unit 130, the printing unit 120 performs the color printing operation at the low printing speed, thereby making it possible to reduce the peak level of power consumption of the multifunction device 100 as a whole.

Further, in the second embodiment, when the printing unit 120 performs the color printing operation, all of the black image forming unit 122-K, the yellow image forming unit 122-Y, the magenta image forming unit 122-M, and the cyan image forming unit 122-C are operated simultaneously. On the other hand, when the printing unit 120 performs the monochrome printing operation, only the black image forming unit 122-K is operated. Further, the fixing temperature in the monochrome printing operation is set lower than the color printing operation. Accordingly, when the printing unit 120 performs the monochrome printing operation, it is possible to reduce the peak level of power consumption of the multifunction device 100 as a whole. Further, it is possible to perform the printing operation at the high speed.

After step S403, the scanner control portion 233 of the scanner unit 130 instructs the printing unit state administration portion 236 to notify the operational state of the printing unit 120. In step S431 shown in FIG. 6(b), after the scanner control portion 233 receives the operational state of the printing unit 120 from the printing unit state administration portion 236, the scanner control portion 233 determines whether the printing unit 120 performs the color printing operation or the monochrome printing operation. When the scanner control portion 233 determines that the printing unit 120 performs the color printing operation, the process proceeds to step S404. When the scanner control portion 233 determines that the printing unit 120 performs the monochrome printing operation, the process proceeds to step S432.

In step S432, the scanner control portion 233 instructs the scanner 133 to perform the reading operation. At this moment, the scanner control portion 233 instructs the scanner 133 to perform the reading operation at the high reading speed.

In step S433, the scanner control portion 233 determines whether the scanner 133 reads the read data of the final page completely. When the scanner control portion 233 determines that the scanner 133 reads the read data of the final page completely, the process proceeds to step S411. When the scanner control portion 233 determines that the scanner 133 does not read the read data of the final page completely, the process returns to step S432, so that the reading operation is continued at the high reading speed.

As described above, in the second embodiment, in the operation of the multifunction device 100 when the reading operation is requested, when the printing unit 120 performs the color printing operation, the reading speed of the scanner unit 130 is changed to the low reading speed, thereby making it possible to reduce the peak level of power consumption of the multifunction device 100 as a whole. For example, when the scanner unit 130 receives the reading operation request signal during the color printing operation of the printing unit 120, the scanner unit 130 performs the reading operation at the low reading speed, thereby making it possible to reduce the peak level of power consumption of the multifunction device 100 as a whole. On the other hand, when the printing unit 120 performs the monochrome printing operation, the peal level of power consumption of the multifunction device 100 as a whole is relatively low. Accordingly, it is possible to perform the scanner reading operation at the high speed.

Third Embodiment

Figure 7:
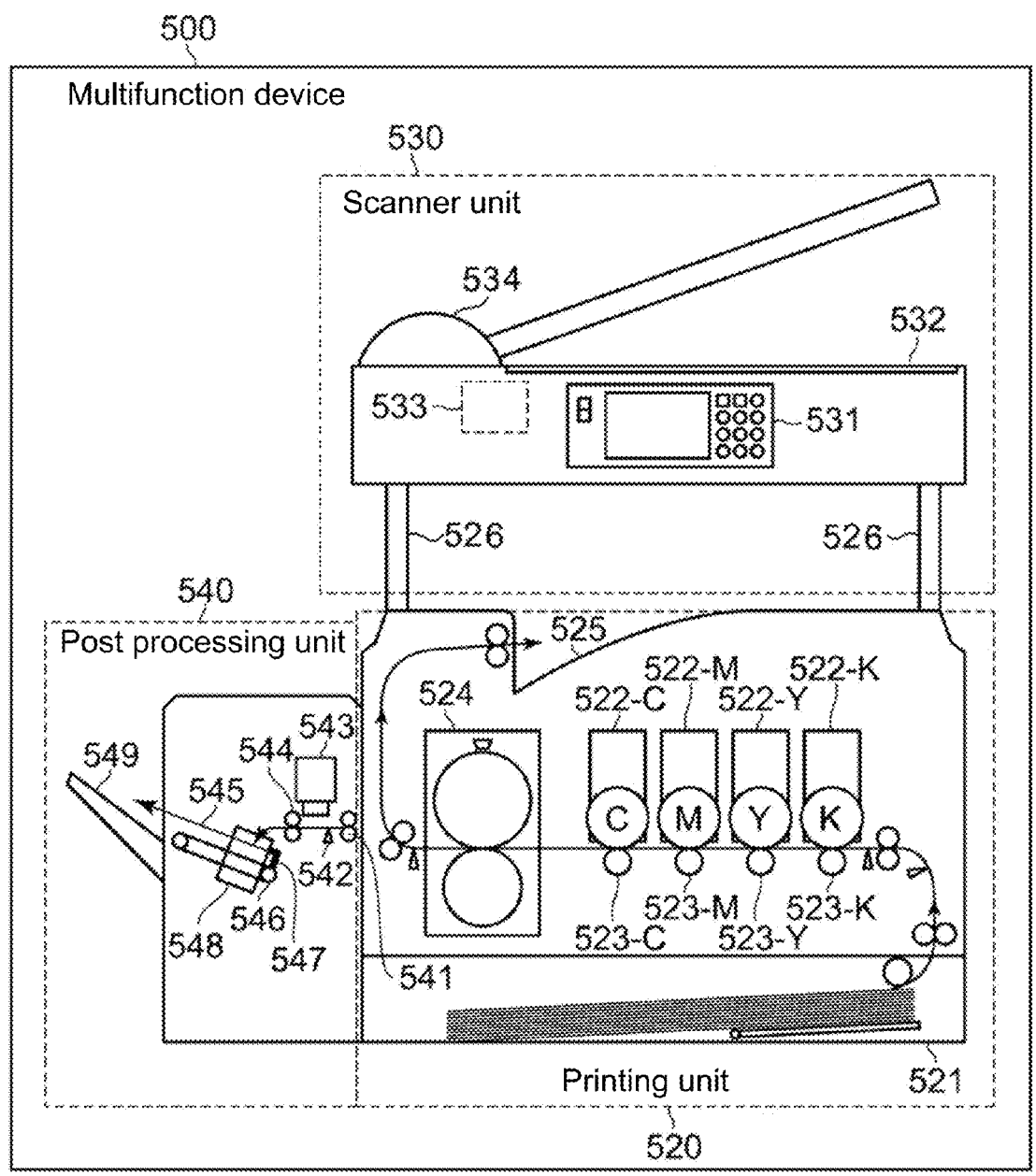
FIG. 7 is a schematic sectional view showing a configuration of a multifunction device according to a third embodiment of the present invention.

A third embodiment of the present invention will be explained next. FIG. 7 is a schematic sectional view showing a configuration of a multifunction device 500 as an information processing apparatus or an image forming apparatus according to the third embodiment of the present invention.

As shown in FIG. 7, the multifunction device 500 as the information processing apparatus or the image forming apparatus includes a printing unit 520 for printing on the print medium, a scanner unit 530 for reading the original and a post processing unit 540 for performing a staple process and a punching process. The print medium may include a sheet of paper. A plurality of supporting members 526 is disposed under the printing unit 520 disposed at a lower portion of the multifunction device 500, so that the supporting members 526 support the scanner unit 530 disposed at an upper portion of the multifunction device 500. The post processing unit 540 is arranged adjacent to the printing unit 520, so that the post processing unit 540 performs the post processing operation on the print medium printed with the printing unit 520.

In the embodiment, the printing unit 520 includes a sheet storage tray 521 for storing the print medium and an image forming portion 522 to which the print medium is transported one by one. The image forming portion 522 is configured to form an image on a photosensitive drum using developer through an electro-photographic process.

In the embodiment, in order to form a color image, the image forming portion 522 includes a black image forming unit 522-K, a yellow image forming unit 522-Y, a magenta image forming unit 522-M, and a cyan image forming unit 522-C. A transfer portion 523 is configured to transfer a developer image formed on the photosensitive drum of the image forming portion 522 to the print medium. Similarly, in order to form the color image, the transfer portion 523 includes a black transfer unit 523-K, a yellow transfer unit 523-Y, a magenta transfer unit 523-M, and a cyan transfer unit 523-C. A fixing portion 524 is configured to fix the developer image transferred to the print medium to the print medium through heat. A main body stacker 525 is disposed at the upper portion of the printing unit 520 for discharging and stacking the print medium thus printed.

In the embodiment, the scanner unit 530 includes an operation panel 531 having a display unit such as an LCD (Liquid Crystal Display) and the like and a switch, so that the scanner unit 530 receives scan data according to an operation of an operator. The scan data include a reading density, a size of the original, the number of sheets in case of copying, a size of the print medium, and the like.

In the embodiment, a contact glass 532 is configured to place the original one by one as a reading subject. A scanner 533 is disposed inside the scanner unit 530 for reading the original as the reading subject and converting to the read data. An auto feeder 534 is configured to feed a plurality of originals one by one when there is a plurality of originals, and transporting the original to a reading position of the scanner 533, so that the scanner unit 530 reads the originals automatically.

In the embodiment, the post processing unit 540 includes a first transportation roller 541 disposed at a front portion of the post processing unit 540 for receiving the print medium from the printing unit 520 after the printing operation is performed on the print medium, and for transporting the print medium to a punching unit 543. A supply sensor 542 is configured to detect that the post processing unit 540 receives the print medium. The punching unit 543 is configured to punch a hole in the print medium thus transported as necessary.

In the embodiment, the post processing unit 540 further includes a second transportation roller 544 for transporting the print medium to a staple stacker 545. The staple stacker 545 is configured to accumulate a specific number of the print media, so that the staple process is performed on the print media. A staple unit 548 is configured to perform the staple process collectively on the print media accumulated in the staple stacker 545. A discharge belt 546 and a discharge claw 547 fixed to the discharge belt 546 are configured to transport the print media to a discharge stacker 549 after the staple process is performed on the print media.

Figure 8:
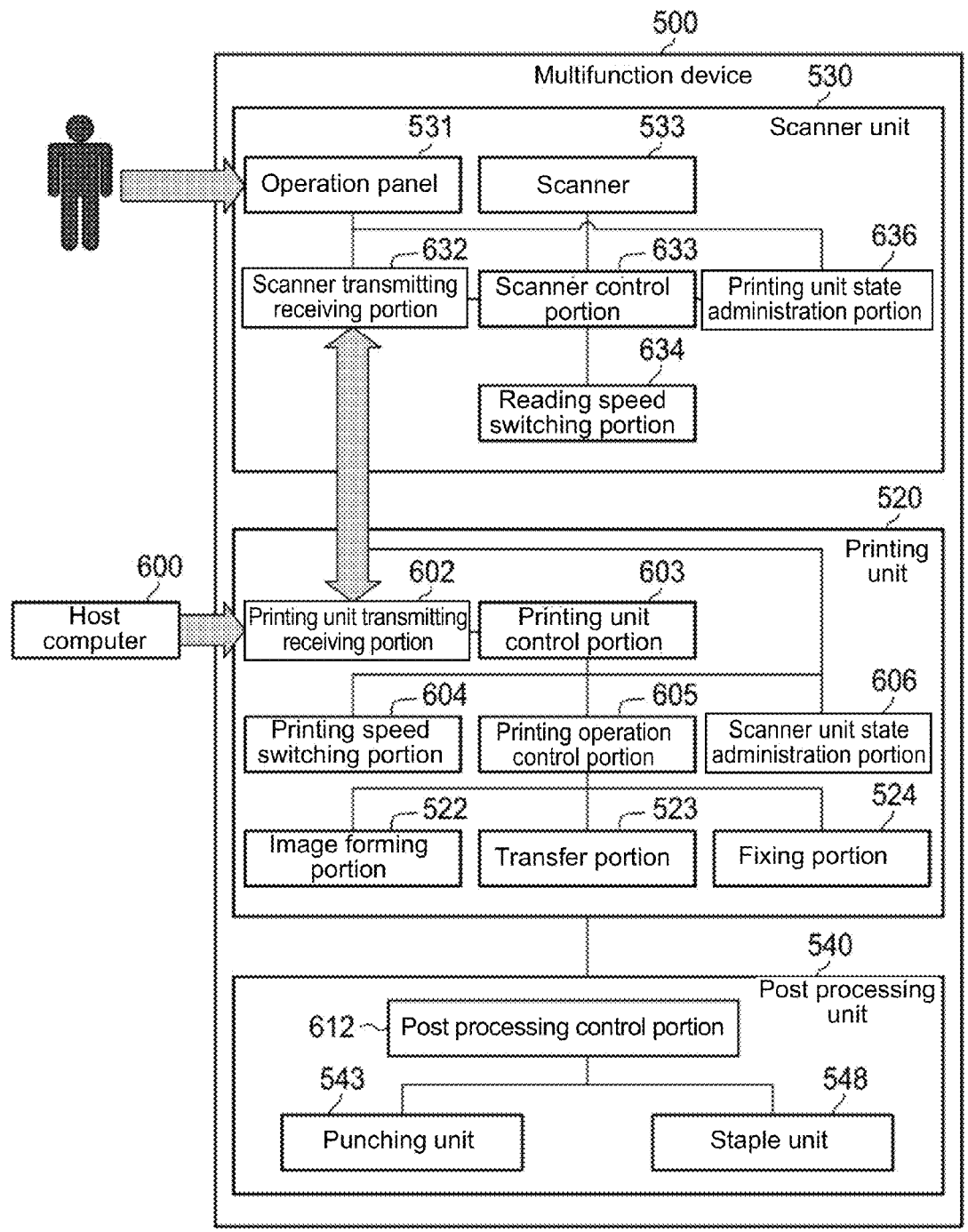
FIG. 8 is a block diagram showing the configuration of the multifunction device according to the third embodiment of the present invention.

FIG. 8 is a block diagram showing the configuration of the multifunction device 500 according to the third embodiment of the present invention. As shown in FIG. 8, the printing unit 520 includes a printing unit transmitting receiving portion 602 as a printing operation requesting receiving portion for transmitting and receiving the print data as the printing operation request signal with a host computer 600 that is configured to transmit the print information. Further, the printing unit transmitting receiving portion 602 is configured to transmit and receive the scan data and the read data with respect to a scanner transmitting receiving portion 632 of the scanner unit 530.

In the embodiment, the printing unit 520 further includes a printing unit control portion 603 as a control portion for controlling each component of the printing unit 520 and a post processing control portion of the post processing unit 540. A printing operation control portion 605 is configured to control each component of the image forming portion 522, the transfer portion 523, the fixing portion 524, and the like, so that the printing operation control portion 605 controls the printing operation. A scanner unit state administration portion 606 is configured to hold information regarding an operational state of the scanner unit 530 such as a driven state or a waiting state. A printing speed switching portion 604 is configured to switch the printing speed under control of the printing unit control portion 603 according to the operational state of the scanner unit 530.

In the embodiment, in the scanner unit 530, the operation panel 531 is configured to receive the request of the scanner reading operation operated by the operator. The scanner transmitting receiving portion 632 is configured to transmit and receive the scan data and the read data with respect to the operation panel 531 and the printing unit transmitting receiving portion 602 after the operation panel 531 receives the request of the scanner reading operation. A scanner control portion 633 as a control portion is configured to control the scanner 533 for performing the scanner reading operation. Further, the scanner control portion 633 is configured to control each component of the scanner unit 530.

In the embodiment, a printing unit state administration portion 636 is configured to hold information regarding an operational state of the printing unit 520 such as the driven state and the waiting state. A reading speed switching portion 634 is configured to switch the reading speed of the scanner 533 under control of the scanner control portion 633 according to the operational state of the printing unit 520.

In the embodiment, in the post processing unit 540, a post processing control portion 612 is configured to control an operation of the punching unit 543 and the staple unit 548 for performing the punching and staple process under the control of the printing unit control portion 603. The punching unit 543 is configured to perform the punching process to punch a hole in the print medium one by one. The staple unit 548 is configured to perform the staple process on the print media arranged in a plurality of sheets.

Figure 9:
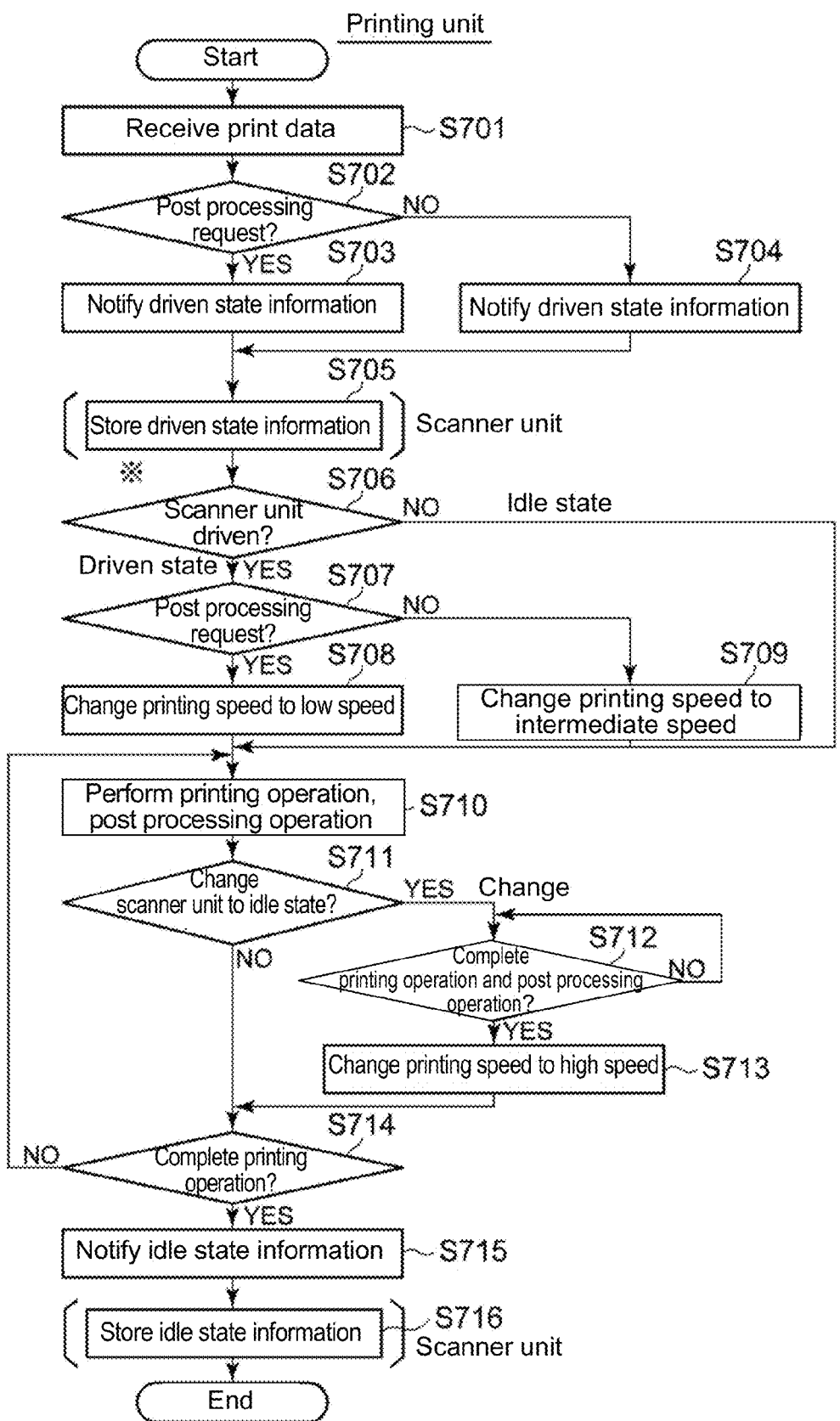
FIG. 9 is a flow chart showing an operation of the multifunction device when the printing operation is requested according to the third embodiment of the present invention.

An operation of the multifunction device 500 will be explained. In the following description, the operation of the multifunction device 500 will be explained separately when the printing operation is requested and when the scanner reading operation is requested. FIG. 9 is a flow chart showing the operation of the multifunction device 500 when the printing operation is requested according to the third embodiment of the present invention.

In step S701, the printing unit transmitting receiving portion 602 of the printing unit 520 receives the print data as the request signal of the printing operation from the host computer 600. In step S702, after the printing unit transmitting receiving portion 602 receives the print data, the printing unit transmitting receiving portion 602 determines whether the print data includes a post processing request. When the printing unit transmitting receiving portion 602 determines that the print data includes the post processing request, the process proceeds to step S703. When the printing unit transmitting receiving portion 602 determines that the print data does not include the post processing request, the process proceeds to step S704.

In step S703, when the printing unit transmitting receiving portion 602 determines that the print data includes the post processing request, the printing unit transmitting receiving portion 602 notifies the driven state information indicating that the printing unit 520 performs the printing operation and the post processing operation to the scanner transmitting receiving portion 632 of the scanner unit 530. In step S704, when the printing unit 520 performs the printing operation normally, the printing unit transmitting receiving portion 602 notifies the driven state information indicating that the printing unit 520 performs the printing operation to the scanner transmitting receiving portion 632.

In step S705, the scanner transmitting receiving portion 632 of the scanner unit 530 notifies the driven state information thus notified to the scanner control portion 633. Then, the scanner control portion 633 instructs the printing unit state administration portion 636 to store the driven state information thus notified.

In step S706, the printing unit control portion 603 of the printing unit 520 instructs the scanner unit state administration portion 606 to notify the operational state of the scanner unit 530. When the printing unit control portion 603 obtains the operational state of the scanner unit 530 from the scanner unit state administration portion 606, the printing unit control portion 603 determines whether the scanner unit 530 is driven. When the printing unit control portion 603 determines that the scanner unit 530 is driven, the process proceeds to step S707. When the printing unit control portion 603 determines whether the scanner unit 530 is not driven, that is, the scanner unit 530 is in the idle state, the process proceeds to step S710.

In step S707, when the printing unit control portion 603 determines that the scanner unit 530 is driven, the printing unit control portion 603 determines whether the print data includes the post processing request one more time. When the printing unit transmitting receiving portion 602 determines that the print data includes the post processing request, the process proceeds to step S708. When the printing unit transmitting receiving portion 602 determines that the print data does not include the post processing request, the process proceeds to step S709.

In step S708, when the printing unit control portion 603 determines that the scanner unit 530 is driven, and the print data includes the post processing request, the printing unit control portion 603 instructs the printing speed switching portion 604 to change the printing speed to the low speed. In the embodiment, the fixing temperature of the fixing portion 124 can be set to three levels of temperatures, a high temperature, an intermediate temperature, and a low temperature. When the printing speed switching portion 604 changes the printing speed to the low speed, the fixing temperature of the fixing portion 124 is set to the low temperature.

In step S709, when the printing unit control portion 603 determines that the scanner unit 530 is driven, and the print data does not include the post processing request, the printing unit control portion 603 instructs the printing speed switching portion 604 to change the printing speed to an intermediate speed. When the printing speed switching portion 604 changes the printing speed to the intermediate speed, the fixing temperature of the fixing portion 124 is set to the intermediate temperature.

In step S710, the printing unit control portion 603 instructs the printing operation control portion 605 to perform the printing operation. Further, the printing operation control portion 605 starts the operation of the image forming portion 522, the transfer portion 523, and the fixing portion 524. At this moment, the printing operation control portion 605 performs the printing operation at the printing speed thus changed with the printing speed switching portion 604. More specifically, when the scanner unit 530 is driven, the printing operation control portion 605 performs the printing operation at the low speed or the intermediate speed. When the scanner unit 530 is in the idle state, the printing operation control portion 605 performs the printing operation at the high speed. Further, when the post processing operation is requested, the printing unit control portion 603 instructs the post processing control portion 612 to operate the punching unit 543 or the staple unit 548.

In step S711, during the printing operation of the printing unit 520, the printing unit control portion 603 instructs the scanner unit state administration portion 606 to notify the operational state of the scanner unit 530. Then, when the printing unit control portion 603 obtains the operational state of the scanner unit 530 from the scanner unit state administration portion 606, the printing unit control portion 603 determines whether the scanner unit 530 is changed to the idle state. When the printing unit control portion 603 determines that the scanner unit 530 is changed to the idle state, the process proceeds to step S712. When the printing unit control portion 603 determines that the scanner unit 530 is maintained in the driven state or the idle state, the process proceeds to step S714.

In step S712, when the printing unit control portion 603 determines that the scanner unit 530 is changed to the idle state, the printing unit control portion 603 instructs the printing operation control portion 605 and the post processing control portion 612 of the post processing unit 540 to monitor whether the printing operation and the post processing operation are completed on the print medium as the subject of the image forming operation (for example, the first sheet).

In step S713, when the printing operation and the post processing operation are completed on the print medium as the subject of the image forming operation, the printing unit control portion 603 instructs the printing speed switching portion 604 to change the printing speed of the printing operation on the print medium to become the subject of the printing operation next (for example, the second sheet and after) to the high speed. At this moment, when the printing speed is increased, the fixing temperature of the fixing portion 124 may be increased.

In step S714, the printing unit control portion 603 determines whether the printing operation of the print data is completed. When the printing unit control portion 603 determines that the printing operation of the print data is completed, the process proceeds to step S715. When the printing unit control portion 203 determines that the printing operation of the print data is not completed, the process returns to step S710, so that the printing operation is continued.

In step S715, when the printing unit control portion 603 determines that the printing operation of the print data is completed, the printing unit transmitting receiving portion 602 notifies the scanner transmitting receiving portion 632 of the scanner unit 530 that the printing unit 520 becomes the idle state as the idle state information.

In step S716, the scanner transmitting receiving portion 632 of the scanner unit 530 notifies the idle state information thus notified to the scanner control portion 633. Then, the scanner control portion 633 instructs the printing unit state administration portion 636 to store the idle state information thus notified.

As described above, in the embodiment, the printing unit 520 is provided with the printing speed switching portion 604. Accordingly, in the operation of the multifunction device 500 when the printing operation is requested, when the printing unit 520 receives the print request signal during the reading operation of the scanner unit 530, and the post processing operation is requested, it is possible to perform the printing operation at the low speed. As a result, it is possible to reduce the peak level of power consumption of the multifunction device 500 as a whole.

Especially, when the printing unit 520 receives the print request signal during the post processing operation such as stapling, punching, and the like after the image is formed on the print medium, it is possible to perform the printing operation at the low speed. As a result, it is possible to reduce the peak level of power consumption of the multifunction device 500 as a whole.

Further, in the embodiment, the printing unit 520 is provided with the scanner unit state administration portion 606. Accordingly, when the scanner unit 530 is changed to the idle state during the printing operation, and the printing operation and the post processing operation are completed on the print medium as the subject of the image forming operation (for example, the first sheet), it is possible to perform the printing operation at the high speed on the print medium to become the subject of the image forming operation next (for example, the second sheet and after).

Figure 10:
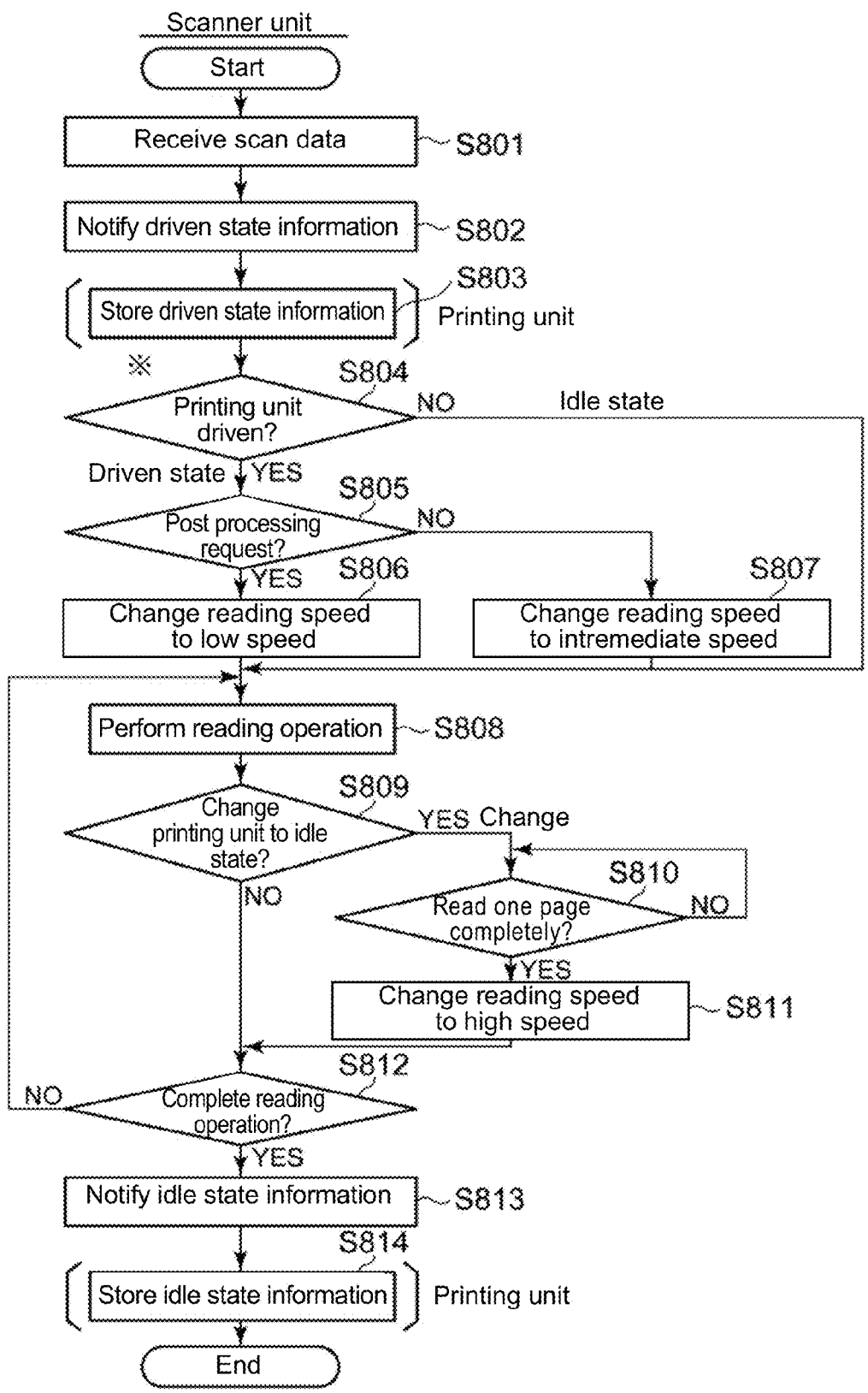
FIG. 10 is a flow chart showing the operation of the multifunction device when the scanner reading operation is requested according to the third embodiment of the present invention.

FIG. 10 is a flow chart showing the operation of the multifunction device 500 when the scanner reading operation is requested according to the third embodiment of the present invention.

In step S801, the scanner transmitting receiving portion 632 of the scanner unit 530 receives the scan data as the request signal of the scanner reading operation from the operation panel 531 that the operator operates.

In step S802, after the scanner transmitting receiving portion 632 receives the scan data, the scanner transmitting receiving portion 632 notifies the driven state information indicating that the scanner unit 530 is being driven to the printing unit transmitting receiving portion 602 of the printing unit 520.

In step S803, the printing unit transmitting receiving portion 602 of the printing unit 520 notifies the driven state information of the scanner unit 530 thus notified to the printing unit control portion 603. Then, the printing unit control portion 603 instructs the scanner unit state administration portion 606 to store the driven state information thus notified.

In step S804, the scanner control portion 633 of the scanner unit 530 instructs the printing unit state administration portion 636 to notify the operational state of the printing unit 520. When the scanner control portion 633 obtains the operational state of the printing unit 520 from the printing unit state administration portion 636, the scanner control portion 633 determines whether the printing unit 520 is driven. When the scanner control portion 633 determines that the printing unit 520 is driven, the process proceeds to step S805. When the scanner control portion 633 determines whether the printing unit 520 is not driven, that is, the printing unit 520 is in the idle state, the process proceeds to step S808.

In step S805, when the scanner control portion 633 determines that the printing unit 520 is driven, the scanner control portion 633 determines whether the post processing request is included in the print data according to the driven state information stored in the printing unit state administration portion 636. When the scanner control portion 633 determines that the post processing request is included in the print data, the process proceeds to step 806. When the scanner control portion 633 determines that the post processing request is not included in the print data, the process proceeds to step 807.

In step S806, When the scanner control portion 633 determines that the printing unit 520 is driven and the post processing request is included in the print data, the scanner control portion 633 instructs the reading speed switching portion 634 to change the scanner reading speed to the low speed. Accordingly, the scanner 533 performs the reading operation at the low speed.

In step S807, When the scanner control portion 633 determines that the printing unit 520 is driven and the post processing request is not included in the print data, the scanner control portion 633 instructs the reading speed switching portion 634 to change the scanner reading speed to the intermediate speed. Accordingly, the scanner 533 performs the reading operation at the intermediate speed.

In step S808, the scanner control portion 633 instructs the scanner 533 to perform the reading operation. At this moment, the scanner control portion 633 instructs the scanner 533 to perform the reading operation at the scanner reading speed thus changed with the reading speed switching portion 634. More specifically, when the printing unit 520 is driven, the scanner 533 performs the reading operation at the low speed or the intermediate speed. When the printing unit 520 is in the idle state, the scanner 533 performs the reading operation at the high speed.

In step S809, during the reading operation of the scanner 533, the scanner control portion 633 instructs the printing unit state administration portion 636 to notify the operational state of the printing unit 520. Then, when the scanner control portion 633 obtains the operational state of the printing unit 520 from the printing unit state administration portion 636, the scanner control portion 633 determines whether the printing unit 520 is changed to the idle state. When the scanner control portion 633 determines that the printing unit 520 is changed to the idle state, the process proceeds to step S810. When the scanner control portion 633 determines that the printing unit 520 is maintained in the driven state or the idle state, the process proceeds to step S812.

In step S810, when the scanner control portion 633 determines that the printing unit 520 is changed to the idle state, the scanner control portion 633 instructs the scanner 533 to notify whether one page of the original as the subject of the reading operation is read completely. Further, the scanner control portion 633 monitors whether the one page of the original is completely read.

In step S811, when the one page of the original as the subject of the reading operation is completely read, the scanner control portion 633 instructs the reading speed switching portion 634 to change the reading speed of the original as the subject of the reading operation next to the high speed. Accordingly, the scanner control portion 633 reads the original as the subject of the reading operation next at the high speed of the reading speed.

In step S812, the scanner control portion 633 determines whether the reading operation of the scanner 533 is completed. When the scanner control portion 633 determines that the scanner 533 completely reads the reading data of the final page, the process proceeds to step S813. When the scanner control portion 633 determines that the scanner 133 does not completely read the reading data of the final page, the process returns to step S808, so that the reading operation is continued at the high speed, the intermediate speed, or the low speed of the reading speed.

In step S813, when the scanner control portion 633 determines that the reading operation of the scanner 533 is completed, the scanner transmitting receiving portion 632 notifies the printing unit transmitting receiving portion 602 of the printing unit 520 that the scanner unit 530 becomes the idle state as the idle state information.

In step S814, the printing unit transmitting receiving portion 602 of the printing unit 520 notifies the idle state information of the scanner unit 530 thus notified to the printing unit control portion 603. Then, the printing unit control portion 603 instructs the scanner unit state administration portion 606 to store the idle state information thus notified.

As described above, in the embodiment, the scanner unit 530 is provided with the reading speed switching portion 634. Accordingly, in the operation of the multifunction device 100 when the scanner reading operation is requested, when the scanner unit 530 receives the reading request signal during the printing operation of the printing unit 520, and the post processing operation is requested, it is possible to perform the reading operation at the low speed. As a result, it is possible to reduce the peak level of power consumption of the multifunction device 500 as a whole.

Especially, when the scanner unit 530 receives the reading request signal during the post processing operation such as stapling, punching, and the like after the image is formed on the print medium, it is possible to perform the reading operation at the low speed. As a result, it is possible to reduce the peak level of power consumption of the multifunction device 500 as a whole.

Further, in the embodiment, the scanner unit 530 is provided with the printing unit state administration portion 636. Accordingly, when the printing unit 520 is changed to the idle state during the reading operation and one page of the original as the subject of the reading operation is read completely, it is possible to change the reading speed of the scanner 533 to the high speed when the scanner 533 reads the original as the subject of reading operation next and after.

As described above, in the embodiment, the multifunction device 500 includes the components for performing a plurality of operations including the post processing unit 540. Further, the multifunction device 500 is configured such that it is possible to perform one of the operations at the low speed or the high speed according to the operational state of the other operations. As a result, it is possible to reduce the peak level of power consumption of the multifunction device 500 as a whole while maintaining the same level of performance as much as possible.

Fourth Embodiment

A fourth embodiment of the present invention will be explained next. In the third embodiment, the printing unit 520 is configured to perform the printing operation capable of forming the color image. In the fourth embodiment, the printing unit 520 is configured to perform the printing operation for forming the monochrome image.

Figure 11:
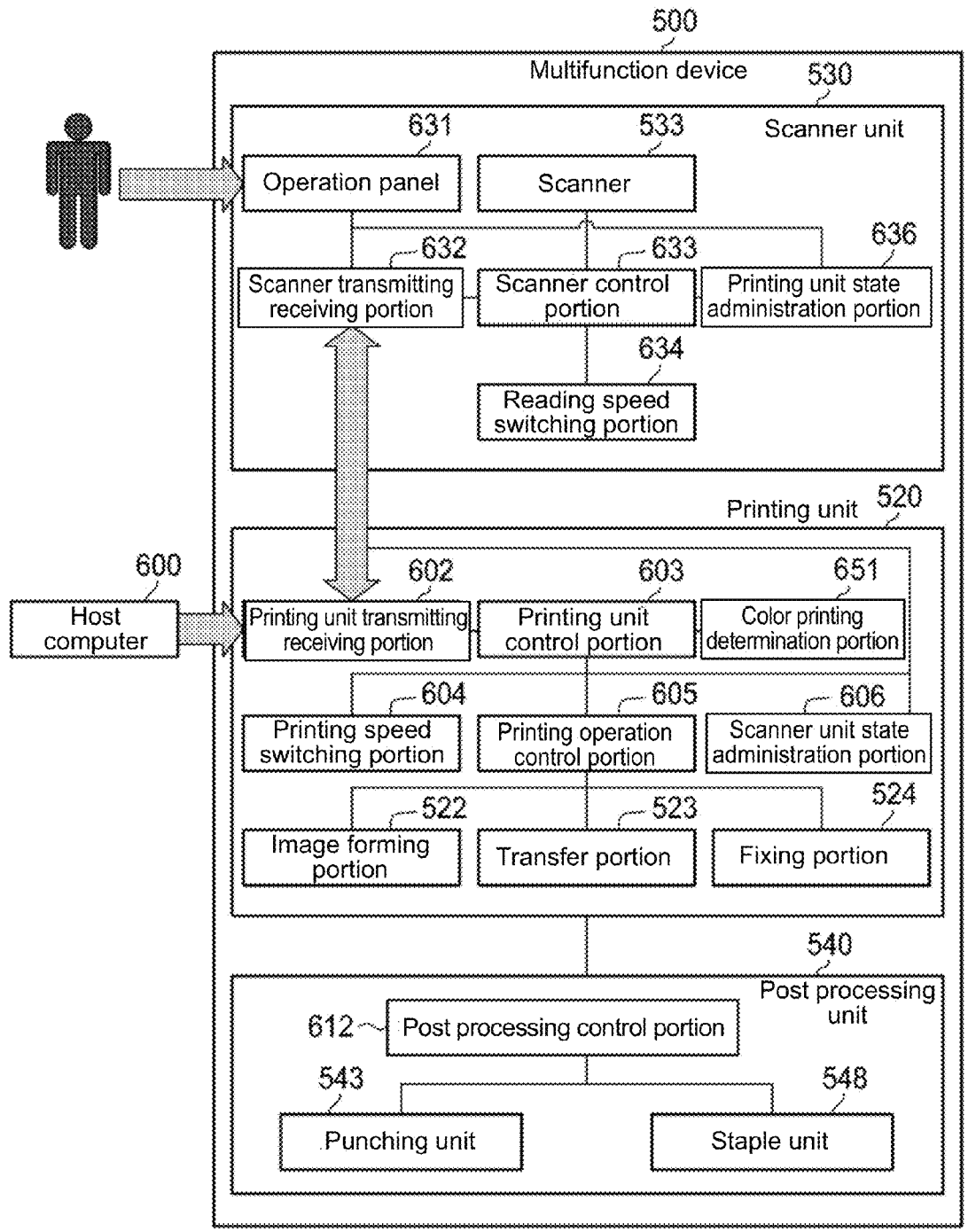
FIG. 11 is a block diagram showing a configuration of a multifunction device according to a fourth embodiment of the present invention.

FIG. 11 is a block diagram showing a configuration of the multifunction device 500 according to the fourth embodiment of the present invention.

In the fourth embodiment, different from the configuration of the multifunction device 500 in the third embodiment shown in FIG. 8, the printing unit 120 includes a color printing determination portion 651. The color printing determination portion 651 is provided for determining whether the printing unit 520 performs the color printing operation or the monochrome printing operation. Further, in the scanner unit 530, the printing unit state administration portion 636 is configured to store the information indicating whether the operational state of the printing unit 520 is the driven state or the idle state. When the operational state of the printing unit 520 is the driven state, the printing unit state administration portion 636 is configured to store the information indicating whether the printing unit 120 performs the color printing operation or the monochrome printing operation. Other components shown in FIG. 11 are similar to those of the multifunction device 500 in the first embodiment shown in FIG. 8, and explanations thereof are omitted.

Figure 12A:
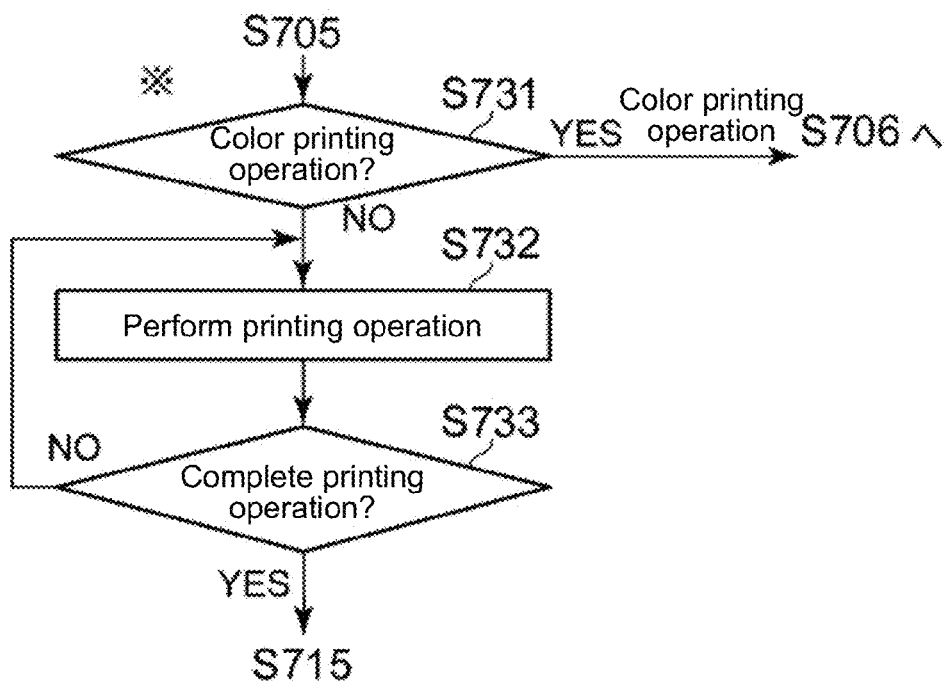
Figure 12B:
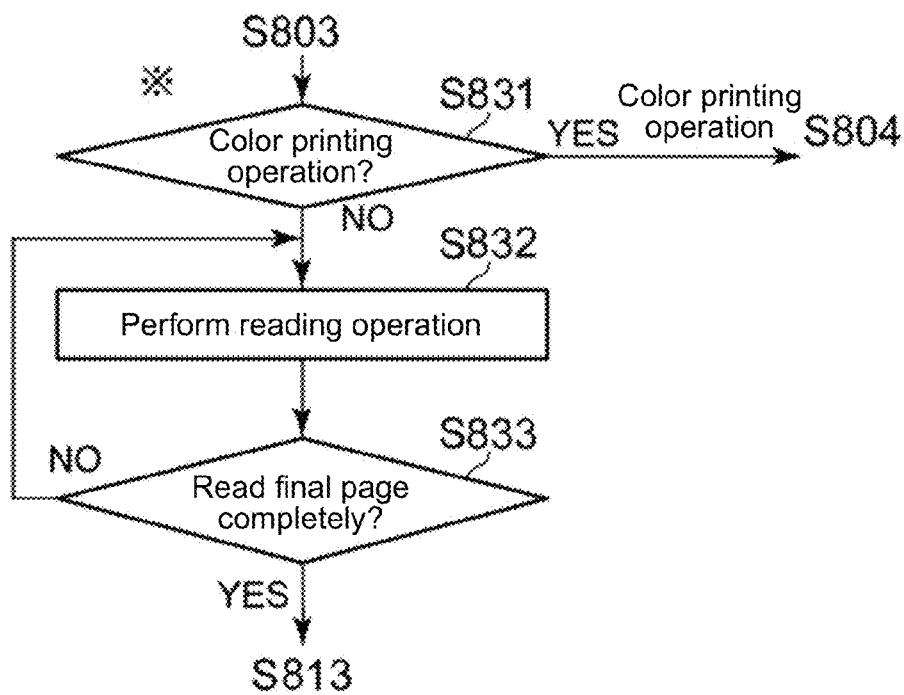

FIGS. 12(*a*) and 12(*b*) are flow charts showing an operation of the multifunction device 500 according to the fourth embodiment of the present invention. More specifically, FIG. 12(*a*) is a flow chart showing the operation of the multifunction device 500 when the printing operation is requested, and FIG. 12(*b*) is a flow chart showing the operation of the multifunction device 500 when the scanner reading operation is requested.

After step S705, in step S731 shown in FIG. 12(*a*), the printing unit control portion 603 of the printing unit 520 instructs the color printing determination portion 651 to determine whether the printing unit 520 performs the color printing operation or the monochrome printing operation. When the color printing determination portion 651 determines that the printing unit 520 performs the color printing operation, the process proceeds to step S706. When the color printing determination portion 651 determines that the printing unit 520 does not perform the color printing operation, that is, the printing unit 520 performs the monochrome printing operation, the process proceeds to step S732.

In step S732, the printing unit control portion 603 instructs the printing operation control portion 605 to perform the printing operation. Further, the printing operation control portion 605 starts the operation of the image forming portion 522, the transfer portion 523, and the fixing portion 524. At this moment, the printing operation control portion 605 performs the printing operation at the high printing speed.

In step S733, the printing unit control portion 603 determines whether the printing operation of the print data is completed. When the printing unit control portion 603 determines that the printing operation of the print data is completed, the process proceeds to step S715. When the printing unit control portion 603 determines that the printing operation of the print data is not completed, the process returns to step S732, so that the printing operation is continued at the high printing speed.

As described above, in the fourth embodiment, in the operation of the multifunction device 500 when the printing operation is requested, when the printing unit 520 performs the color printing operation, and the post processing request is included, the printing speed is changed to the low printing speed, thereby making it possible to reduce the peak level of power consumption of the multifunction device 500 as a whole. For example, when the printing unit 520 receives the printing request signal of the color printing operation during the reading operation of the scanner unit 530, the printing unit 520 performs the color printing operation at the low printing speed, thereby making it possible to reduce the peak level of power consumption of the multifunction device 500 as a whole. When the printing unit 520 performs the color printing operation, it is possible to perform the printing operation at the high speed.

After step S803, the scanner control portion 633 of the scanner unit 530 instructs the printing unit state administration portion 636 to notify the operational state of the printing unit 520. In step S831 shown in FIG. 12(*b*), after the scanner control portion 633 receives the operational state of the printing unit 520 from the printing unit state administration portion 636, the scanner control portion 633 determines whether the printing unit 520 performs the color printing operation or the monochrome printing operation. When the scanner control portion 633 determines that the printing unit 520 performs the color printing operation, the process proceeds to step S804. When the scanner control portion 633 determines that the printing unit 520 performs the monochrome printing operation, the process proceeds to step S832.

In step S832, the scanner control portion 633 instructs the scanner 533 to perform the reading operation. At this moment, the scanner control portion 633 instructs the scanner 533 to perform the reading operation at the high reading speed.

In step S833, the scanner control portion 633 determines whether the scanner 533 reads the read data of the final page completely. When the scanner control portion 633 determines that the scanner 533 reads the read data of the final page completely, the process proceeds to step S813. When the scanner control portion 633 determines that the scanner 533 does not read the read data of the final page completely, the process returns to step S832, so that the reading operation is continued at the high reading speed.

As described above, in the fourth embodiment, in the operation of the multifunction device 500 when the reading operation is requested, when the printing unit 120 performs the color printing operation, and the post processing request is included, the reading speed of the scanner unit 530 is changed to the low reading speed, thereby making it possible to reduce the peak level of power consumption of the multifunction device 500 as a whole. On the other hand, when the printing unit 520 performs the monochrome printing operation, the peal level of power consumption of the multifunction device 100 as a whole is relatively low. Accordingly, it is possible to perform the scanner reading operation at the high speed.

In the first to fourth embodiments of the present invention, the present invention is applied to the multifunction device 100 or the multifunction device 500 as the image processing apparatus or the image forming apparatus having the printing function and the scanner function. The present invention is applicable to a multifunction apparatus as an image processing apparatus or an image forming apparatus having a printer function, a facsimile function or a copier function. Further, the present invention is applicable to a multifunction apparatus as an image processing apparatus or an image forming apparatus having other various functions.

Further, in the first embodiment, when the print data is received, and the scanner unit 130 is in the driven state, the printing unit 120 performs the printing operation at the low speed. Instead of performing the printing operation at the low speed, the scanner unit 130 may perform the reading operation at the low speed. Further, both the printing unit 120 and the scanner unit 130 perform the printing operation and the reading operation at the low speed, respectively.

Further, in the first embodiment, when the reading operation is requested, and the printing unit 120 in the driven state, the scanner unit 130 performs the reading operation at the low speed. Instead of performing the reading operation at the low speed, the printing unit 120 may perform the printing operation at the low speed. Further, both the printing unit 120 and the scanner unit 130 perform the printing operation and the reading operation at the low speed, respectively.

In this case, it is determined which of the printing unit 120 or the scanner unit 130 performs the printing operation or the reading operation at the low speed according to a priority order defined in advance. Further, it may be configured such that the priority order is set through the operation panel 131 according to the operation of the user.

The disclosure of Japanese Patent Application No. 2011-188192, filed on Aug. 31, 2011, is incorporated in the application by reference.

While the invention has been explained with reference to the specific embodiments of the invention, the explanation is illustrative and the invention is limited only by the appended claims.

What is claimed is:

1. An information processing apparatus, comprising:
    a first processing unit configured to perform a first process;
    a second processing unit configured to perform a second process;
    a third processing unit configured to perform a third process; and
    a speed switching unit configured to switch a processing speed of the second processing unit according to a driven state of the first processing unit,
    wherein said speed switching unit is configured to control the second processing unit to start the second process at a first processing speed while the first processing unit is not in the driven state when the second processing unit starts the second process,
    said speed switching unit is configured to control the second processing unit to start the second process at a second processing speed lower than the first processing speed while the first processing unit is in the driven state when the second processing unit starts the second process,
    said second processing unit is configured to perform the second process at the first processing speed while the first processing unit is not performing the first process and the third processing unit is not performing the third process,
    said second processing unit is configured to switch the first processing speed to the second processing speed lower than the first processing speed to perform the second process while the first processing unit is performing the first process simultaneously and the third processing unit is not performing the third process, and
    said second processing unit is configured to switch the first processing speed or the second processing speed to a third processing speed lower than the second processing speed while the first processing unit is performing the first process simultaneously and the third processing unit is performing the third process simultaneously.

2. The information processing apparatus according to claim 1, wherein said first processing unit is an original reading unit for performing a reading operation of an original as the first process, and
    said second processing unit is an image forming unit for forming an image on a medium as the second process.

3. The information processing apparatus according to claim 1, wherein said first processing unit is an image forming unit for forming an image on a medium as the first process, and
    said second processing unit is an original reading unit for performing a reading operation of an original as the second process.

4. The information processing apparatus according to claim 2, wherein said image forming unit is configured to perform a color image forming process at the second processing speed while the original reading unit is performing the reading operation of the original, and
    said image forming unit is configured to perform a monochrome image forming process at the first processing speed while the original reading unit is performing the reading operation of the original.

5. The information processing apparatus according to claim 3, wherein said original reading unit is configured to perform the reading operation of the original at the second processing speed while the image forming unit is performing a color image processing, and
    said original reading unit is configured to perform the reading operation of the original at the first processing speed while the image forming unit is performing a monochrome image processing.

6. The information processing apparatus according to claim 1, wherein said first processing unit is an original reading unit for performing a reading operation of an original as the first process,
    said second processing unit is an image forming unit for forming an image on a medium as the second process, and
    said third processing unit is a post processing unit for performing a post processing on the medium.

7. The information processing apparatus according to claim 6, wherein said post processing unit is configured to perform a staple operation or a punching operation as the post processing.

8. The information processing apparatus according to claim 1, wherein said first processing unit is an image forming unit for forming an image on a medium as the first process,
    said second processing unit is an original reading unit for performing a reading operation of an original as the second process, and
    said third processing unit is a post processing unit for performing a post processing on the medium.

9. The information processing apparatus according to claim 8, wherein said post processing unit is configured to perform a staple operation or a punching operation as the post processing.

10. The information processing apparatus according to claim 2, wherein said second processing unit is configured to change a processing speed of the second process from the first processing speed to the second processing speed when the first processing unit starts the first process while the second processing unit is executing the second process at the first processing speed.

11. The information processing apparatus according to claim 3, wherein said second processing unit is configured to change a processing speed of the second process from the first processing speed to the second processing speed when the first processing unit starts the first process while the second processing unit is executing the second process at the first processing speed.

12. The information processing apparatus according to claim 1,
wherein said speed switching unit is configured to control the second processing unit to change the second processing speed to the first processing speed, and to continue the second process at the first processing speed when the first processing unit stops performing the first process,
said first processing unit is an original reading unit for performing a reading operation of an original as the first process, and
said second processing unit is an image forming unit for forming an image on a medium as the second process.

13. The information processing apparatus according to claim 12, wherein said second processing unit is configured to change a processing speed of the second process from the first processing speed to the second processing speed when the first processing unit starts the first process while the second processing unit is performing the second process at the first processing speed.

14. The information processing apparatus according to claim 1,
wherein said speed switching unit is configured to control the second processing unit to change the second processing speed to the first processing speed, and to continue the second process at the first processing speed when the first processing unit stops performing the first process,
said first processing unit is an image forming unit for forming an image on a medium as the first process, and
said second processing unit is an original reading unit for performing a reading operation of an original as the second process.

15. The information processing apparatus according to claim 14, wherein said second processing unit is configured to change a processing speed of the second process from the first processing speed to the second processing speed when the first processing unit starts the first process while the second processing unit is performing the second process at the first processing speed.

16. An image forming apparatus comprising:
a reading unit configured to perform a reading operation; and
an image forming unit configured to perform an image forming operation on a medium,
wherein said image forming unit includes:
a request receiving unit configured to receive a request signal of the image forming operation;
a first state administration unit configured to retain an operational state of the reading unit;
a printing speed switching unit configured to switch a processing speed of the image forming operation to a lower speed while the operational state of the reading unit retained in the first state administration unit is being a driven state; and
a first control unit configured to start the image forming operation at the low speed of the processing speed switched with the printing speed switching unit when the request receiving unit receives the request signal of the image forming operation while the operational state of the reading unit retained in the first state administration unit is being the driven state, and
said reading unit includes:
a request obtaining unit configured to obtain a request signal of the reading operation;
a second state administration unit configured to retain an operational state of the image forming unit;
a reading speed switching unit configured to switch a reading speed of the reading operation to a lower speed while the operational state of the image forming unit retained in the second state administration unit is being a driven state; and
a second control unit configured to start the reading operation at the low speed of the reading speed switched with the reading speed switching unit when the request obtaining unit obtains the request signal of the reading operation while the operational state of the image forming unit retained in the second state administration unit is being the driven state.

17. The image forming apparatus according to claim 16, wherein said first state administration unit is configured to obtain information from the reading unit indicating that the operational state of the reading unit is an idle state after the reading unit completes the reading operation, and to obtain information from the reading unit indicating that the operational state of the reading unit is the driven state immediately before the reading unit starts the reading operation, and
said second state administration unit is configured to obtain information from the image forming unit indicating that the operational state of the image forming unit is the idle state after the image forming unit completes the image forming operation, and to obtain information from the image forming unit indicating that the operational state of the image forming unit is the driven state immediately before the reading unit starts the image forming operation.

* * * * *